(12) United States Patent
Haris et al.

(10) Patent No.: US 9,807,031 B2
(45) Date of Patent: Oct. 31, 2017

(54) SYSTEM AND METHOD FOR NETWORK CONFIGURATION

(75) Inventors: Shiv Haris, Palo Alto, CA (US); Suresh Vobbilisetty, San Jose, CA (US)

(73) Assignee: BROCADE COMMUNICATIONS SYSTEMS, INC., San Jose, CA (US)

(*) Notice: Subject to any disclaimer, the term of this patent is extended or adjusted under 35 U.S.C. 154(b) by 0 days.

(21) Appl. No.: 13/184,526

(22) Filed: Jul. 16, 2011

(65) Prior Publication Data

US 2012/0016973 A1   Jan. 19, 2012

Related U.S. Application Data

(60) Provisional application No. 61/364,941, filed on Jul. 16, 2010.

(51) Int. Cl.
*G06F 15/16* (2006.01)
*H04L 12/931* (2013.01)

(52) U.S. Cl.
CPC ................................... *H04L 49/00* (2013.01)

(58) Field of Classification Search
CPC ...... H04L 41/50; H04L 41/508; H04Q 3/0062
USPC ................ 709/217, 219, 223, 225, 226, 250
See application file for complete search history.

(56) References Cited

U.S. PATENT DOCUMENTS

| | | |
|---|---|---|
| 829,529 A | 8/1986 | Keathley |
| 5,390,173 A | 2/1995 | Spinney |
| 5,802,278 A | 9/1998 | Isfeld |
| 5,878,232 A | 3/1999 | Marimuthu |
| 5,879,173 A | 3/1999 | Poplawski |
| 5,959,968 A | 9/1999 | Chin |
| 5,973,278 A | 10/1999 | Wehrli, III |
| 5,983,278 A | 11/1999 | Chong |
| 5,995,262 A | 11/1999 | Hirota |
| 6,041,042 A | 3/2000 | Bussiere |
| 6,085,238 A | 7/2000 | Yuasa |
| 6,092,062 A | 7/2000 | Lohman |
| 6,104,696 A | 8/2000 | Kadambi |
| 6,185,214 B1 | 2/2001 | Schwartz |
| 6,185,241 B1 | 2/2001 | Sun |

(Continued)

FOREIGN PATENT DOCUMENTS

| | | |
|---|---|---|
| CN | 1735062 | 2/2006 |
| CN | 1777149 | 5/2006 |

(Continued)

OTHER PUBLICATIONS

"Switched Virtual Internetworking moved beyond bridges and routers", 8178 Data Communications 23(1994) September, No. 12, New York.

(Continued)

*Primary Examiner* — Viet Vu
(74) *Attorney, Agent, or Firm* — Shun Yao; Park, Vaughan, Fleming & Dowler LLP

(57) ABSTRACT

One embodiment of the present invention provides a network device that facilitates configuration orchestration. During operation, the system interprets a configuration command and stores a data structure representing a set of business logic. The business logic can be triggered by the configuration command, a local condition, or both. Furthermore, the system configures the switch according to an outcome of the business logic.

27 Claims, 11 Drawing Sheets

(56) References Cited

U.S. PATENT DOCUMENTS

| | | |
|---|---|---|
| 6,295,527 B1 | 9/2001 | McCormack |
| 6,331,983 B1 | 12/2001 | Haggerty |
| 6,438,106 B1 | 8/2002 | Pillar |
| 6,498,781 B1 | 12/2002 | Bass |
| 6,542,266 B1 | 4/2003 | Phillips |
| 6,553,029 B1 | 4/2003 | Alexander |
| 6,571,355 B1 | 5/2003 | Linnell |
| 6,583,902 B1 | 6/2003 | Yuen |
| 6,633,761 B1 | 10/2003 | Signhal |
| 6,636,963 B1 | 10/2003 | Stein |
| 6,771,610 B1 | 8/2004 | Seaman |
| 6,870,840 B1 | 3/2005 | Hill |
| 6,873,602 B1 | 3/2005 | Ambe |
| 6,937,576 B1 | 8/2005 | DiBenedetto |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Signhal |
| 7,016,352 B1 | 3/2006 | Chow |
| 7,061,877 B1 | 6/2006 | Gummalla |
| 7,062,177 B1 | 6/2006 | Grivna |
| 7,173,934 B2 | 2/2007 | Lapuh |
| 7,197,308 B2 | 3/2007 | Singhal |
| 7,206,288 B2 | 4/2007 | Cometto |
| 7,310,664 B1 | 12/2007 | Merchant |
| 7,313,637 B2 | 12/2007 | Tanaka |
| 7,315,545 B1 | 1/2008 | Chowdhury et al. |
| 7,316,031 B2 | 1/2008 | Griffith |
| 7,330,897 B2 | 2/2008 | Baldwin |
| 7,380,025 B1 | 5/2008 | Riggins |
| 7,397,768 B1 | 7/2008 | Betker |
| 7,397,794 B1 | 7/2008 | Lacroute |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser, Jr. |
| 7,571,447 B2 * | 8/2009 | Ally et al. .................... 719/330 |
| 7,599,901 B2 * | 10/2009 | Mital et al. .................... 706/46 |
| 7,688,736 B1 | 3/2010 | Walsh |
| 7,688,960 B1 * | 3/2010 | Aubuchon et al. ...... 379/201.12 |
| 7,690,040 B2 | 3/2010 | Frattura |
| 7,706,255 B1 | 4/2010 | Kondrat et al. |
| 7,716,370 B1 | 5/2010 | Devarapalli |
| 7,720,076 B2 | 5/2010 | Dobbins |
| 7,729,296 B1 | 6/2010 | Choudhary |
| 7,787,480 B1 | 8/2010 | Mehta |
| 7,792,920 B2 * | 9/2010 | Istvan et al. ................. 709/217 |
| 7,796,593 B1 | 9/2010 | Ghosh |
| 7,801,021 B1 | 9/2010 | Triantafillis |
| 7,808,992 B2 | 10/2010 | Homchaudhuri |
| 7,836,332 B2 | 11/2010 | Hara |
| 7,843,906 B2 | 11/2010 | Chidambaram et al. |
| 7,843,907 B1 | 11/2010 | Abou-Emara |
| 7,860,097 B1 | 12/2010 | Lovett |
| 7,898,959 B1 | 3/2011 | Arad |
| 7,912,091 B1 | 3/2011 | Krishnan |
| 7,924,837 B1 | 4/2011 | Shabtay |
| 7,937,438 B1 | 5/2011 | Miller |
| 7,937,756 B2 * | 5/2011 | Kay ................. 726/22 |
| 7,945,941 B2 | 5/2011 | Sinha |
| 7,949,638 B1 | 5/2011 | Goodson |
| 7,957,386 B1 | 6/2011 | Aggarwal |
| 8,018,938 B1 | 9/2011 | Fromm |
| 8,027,354 B1 | 9/2011 | Portolani |
| 8,054,832 B1 | 11/2011 | Shukla |
| 8,068,442 B1 | 11/2011 | Kompella |
| 8,078,704 B2 * | 12/2011 | Lee ................. 709/221 |
| 8,090,805 B1 | 1/2012 | Chawla |
| 8,102,781 B2 | 1/2012 | Smith |
| 8,102,791 B2 | 1/2012 | Tang |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,175,107 B1 | 5/2012 | Yalagandula |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Wang |
| 8,301,686 B1 | 10/2012 | Appajodu |
| 8,339,994 B2 | 12/2012 | Gnanasekaran |
| 8,351,352 B1 | 1/2013 | Eastlake, III |
| 8,369,335 B2 | 2/2013 | Jha |
| 8,369,347 B2 | 2/2013 | Xiong |
| 8,392,496 B2 | 3/2013 | Linden |
| 8,451,717 B2 | 5/2013 | Venkataraman et al. |
| 8,462,774 B2 | 6/2013 | Page |
| 8,467,375 B2 | 6/2013 | Blair |
| 8,520,595 B2 | 8/2013 | Yadav |
| 8,553,710 B1 | 10/2013 | White |
| 8,599,850 B2 | 12/2013 | Jha |
| 8,599,864 B2 | 12/2013 | Chung |
| 8,615,008 B2 | 12/2013 | Natarajan |
| 8,619,788 B1 | 12/2013 | Sankaran |
| 8,705,526 B1 | 4/2014 | Hasan |
| 8,706,905 B1 | 4/2014 | McGlaughlin |
| 8,717,895 B2 | 5/2014 | Koponen |
| 8,724,456 B1 | 5/2014 | Hong |
| 8,792,501 B1 | 7/2014 | Rustagi |
| 8,798,045 B1 | 8/2014 | Aybay |
| 8,798,055 B1 | 8/2014 | An |
| 8,799,980 B2 * | 8/2014 | Shafer et al. .................... 726/1 |
| 8,804,736 B1 | 8/2014 | Drake |
| 8,806,031 B1 | 8/2014 | Kondur |
| 8,826,385 B2 | 9/2014 | Congdon |
| 8,918,631 B1 | 12/2014 | Kumar |
| 8,937,865 B1 | 1/2015 | Kumar |
| 8,948,181 B2 | 2/2015 | Kapadia |
| 8,995,272 B2 | 3/2015 | Agarwal |
| 9,178,793 B1 * | 11/2015 | Marlow .................. H04L 12/16 |
| 9,350,680 B2 | 5/2016 | Thayalan |
| 9,401,818 B2 | 7/2016 | Venkatesh |
| 9,438,447 B2 | 9/2016 | Basso |
| 2001/0005527 A1 | 6/2001 | Vaeth |
| 2001/0055274 A1 | 12/2001 | Hegge |
| 2002/0019904 A1 | 2/2002 | Katz |
| 2002/0021701 A1 | 2/2002 | Lavian |
| 2002/0027885 A1 | 3/2002 | Ben-Ami |
| 2002/0039350 A1 | 4/2002 | Wang |
| 2002/0054593 A1 | 5/2002 | Morohashi |
| 2002/0087723 A1 | 7/2002 | Williams |
| 2002/0091795 A1 | 7/2002 | Yip |
| 2003/0026290 A1 | 2/2003 | Umayabashi |
| 2003/0041085 A1 | 2/2003 | Sato |
| 2003/0093567 A1 | 5/2003 | Lolayekar |
| 2003/0097464 A1 | 5/2003 | Martinez |
| 2003/0097470 A1 | 5/2003 | Lapuh |
| 2003/0123393 A1 | 7/2003 | Feuerstraeter |
| 2003/0147385 A1 | 8/2003 | Montalvo |
| 2003/0152075 A1 | 8/2003 | Hawthorne |
| 2003/0174706 A1 | 9/2003 | Shankar |
| 2003/0189905 A1 | 10/2003 | Lee |
| 2003/0189930 A1 | 10/2003 | Terrell |
| 2003/0208616 A1 | 11/2003 | Laing |
| 2003/0216143 A1 | 11/2003 | Roese |
| 2003/0223428 A1 | 12/2003 | BlanquerGonzalez |
| 2003/0233534 A1 | 12/2003 | Bernhard |
| 2004/0001433 A1 * | 1/2004 | Gram et al. .................. 370/229 |
| 2004/0003094 A1 | 1/2004 | See |
| 2004/0008868 A1 | 1/2004 | Bornowski |
| 2004/0010600 A1 | 1/2004 | Baldwin |

(56) References Cited

U.S. PATENT DOCUMENTS

| | | |
|---|---|---|
| 2004/0049699 A1 | 3/2004 | Griffith |
| 2004/0057430 A1 | 3/2004 | Paavolainen |
| 2004/0081171 A1 | 4/2004 | Finn |
| 2004/0095900 A1 | 5/2004 | Siegel |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2004/0225725 A1 | 11/2004 | Enomoto |
| 2004/0243673 A1 | 12/2004 | Goyal |
| 2005/0007951 A1 | 1/2005 | Lapuh |
| 2005/0025179 A1 | 2/2005 | McLaggan |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0108375 A1 | 5/2005 | Hallak-Stamler |
| 2005/0111352 A1 | 5/2005 | Ho |
| 2005/0122979 A1 | 6/2005 | Gross |
| 2005/0152335 A1 | 7/2005 | Lodha |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0259586 A1 | 11/2005 | Hafid |
| 2005/0265330 A1 | 12/2005 | Suzuki |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima |
| 2006/0029055 A1 | 2/2006 | Perera |
| 2006/0034292 A1 | 2/2006 | Wakayama |
| 2006/0036648 A1 | 2/2006 | Frey |
| 2006/0036765 A1 | 2/2006 | Weyman |
| 2006/0039366 A1 | 2/2006 | Ghosh |
| 2006/0059163 A1 | 3/2006 | Frattura |
| 2006/0062187 A1 | 3/2006 | Rune |
| 2006/0072550 A1 | 4/2006 | Davis |
| 2006/0083172 A1 | 4/2006 | Jordan |
| 2006/0083254 A1 | 4/2006 | Ge |
| 2006/0092860 A1 | 5/2006 | Higashitaniguchi |
| 2006/0098589 A1 | 5/2006 | Kreeger |
| 2006/0126511 A1 | 6/2006 | Youn |
| 2006/0140130 A1 | 6/2006 | Kalkunte |
| 2006/0155828 A1 | 7/2006 | Ikeda |
| 2006/0168109 A1 | 7/2006 | Warmenhoven |
| 2006/0184937 A1 | 8/2006 | Abels |
| 2006/0209886 A1 | 9/2006 | Silberman |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0242398 A1 | 10/2006 | Fontijn |
| 2006/0245439 A1 | 11/2006 | Sajassi |
| 2006/0251067 A1 | 11/2006 | Desanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1 | 12/2006 | Cho |
| 2006/0294413 A1 | 12/2006 | Filz |
| 2007/0036178 A1 | 2/2007 | Hares |
| 2007/0053294 A1 | 3/2007 | Ho |
| 2007/0061817 A1 | 3/2007 | Atkinson |
| 2007/0074052 A1 | 3/2007 | Hemmah |
| 2007/0081530 A1 | 4/2007 | Nomura |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0116224 A1* | 5/2007 | Burke et al. ............ 379/201.12 |
| 2007/0121617 A1 | 5/2007 | Kanekar |
| 2007/0130295 A1 | 6/2007 | Rastogi |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0206762 A1 | 9/2007 | Chandra |
| 2007/0211712 A1 | 9/2007 | Fitch |
| 2007/0220059 A1 | 9/2007 | Lu |
| 2007/0226214 A1* | 9/2007 | Smits .................. H04L 67/1008 |
| 2007/0230472 A1 | 10/2007 | Jesuraj |
| 2007/0238343 A1 | 10/2007 | Velleca |
| 2007/0258449 A1 | 11/2007 | Bennett |
| 2007/0274234 A1 | 11/2007 | Kubota |
| 2007/0280223 A1 | 12/2007 | Pan |
| 2007/0289017 A1 | 12/2007 | Copeland, III |
| 2008/0052487 A1 | 2/2008 | Akahane |
| 2008/0056135 A1 | 3/2008 | Lee |
| 2008/0056300 A1 | 3/2008 | Williams |
| 2008/0057918 A1 | 3/2008 | Abrant |
| 2008/0065760 A1 | 3/2008 | Damm |
| 2008/0080517 A1 | 4/2008 | Roy |
| 2008/0095160 A1 | 4/2008 | Yadav |
| 2008/0101386 A1 | 5/2008 | Gray |
| 2008/0112133 A1 | 5/2008 | Torudbakken |
| 2008/0112400 A1 | 5/2008 | Dunbar |
| 2008/0133760 A1 | 6/2008 | Berkvens et al. |
| 2008/0159260 A1 | 7/2008 | Vobbilisetty |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186968 A1 | 8/2008 | Farinacci |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |
| 2008/0267179 A1 | 10/2008 | Lavigne |
| 2008/0285458 A1 | 11/2008 | Lysne |
| 2008/0285555 A1 | 11/2008 | Ogasahara |
| 2008/0288020 A1 | 11/2008 | Einav |
| 2008/0298248 A1 | 12/2008 | Roeck |
| 2008/0304498 A1 | 12/2008 | Jorgensen |
| 2008/0304519 A1 | 12/2008 | Koenen |
| 2008/0310342 A1 | 12/2008 | Kruys |
| 2009/0022069 A1 | 1/2009 | Khan |
| 2009/0024734 A1 | 1/2009 | Merbach |
| 2009/0037607 A1 | 2/2009 | Farinacci |
| 2009/0037977 A1 | 2/2009 | Gai |
| 2009/0041046 A1 | 2/2009 | Hirata |
| 2009/0042270 A1 | 2/2009 | Dolly |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0094354 A1 | 4/2009 | Rastogi |
| 2009/0106298 A1 | 4/2009 | Furusho |
| 2009/0106405 A1 | 4/2009 | Mazarick |
| 2009/0113408 A1 | 4/2009 | Toeroe |
| 2009/0116381 A1 | 5/2009 | Kanda |
| 2009/0122700 A1 | 5/2009 | Aboba |
| 2009/0129384 A1 | 5/2009 | Regan |
| 2009/0138577 A1 | 5/2009 | Casado |
| 2009/0138752 A1 | 5/2009 | Graham |
| 2009/0144720 A1 | 6/2009 | Roush |
| 2009/0161584 A1 | 6/2009 | Guan |
| 2009/0161670 A1 | 6/2009 | Shepherd |
| 2009/0168647 A1 | 7/2009 | Holness |

(56) References Cited

U.S. PATENT DOCUMENTS

| | | |
|---|---|---|
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1* | 9/2009 | Kostal et al. .................... 726/1 |
| 2009/0225752 A1 | 9/2009 | Mitsumori |
| 2009/0232031 A1 | 9/2009 | Vasseur |
| 2009/0245112 A1 | 10/2009 | Okazaki |
| 2009/0245137 A1 | 10/2009 | Hares |
| 2009/0245242 A1 | 10/2009 | Carlson |
| 2009/0246137 A1 | 10/2009 | Hadida Ruah et al. |
| 2009/0249444 A1 | 10/2009 | Macauley |
| 2009/0252049 A1 | 10/2009 | Ludwig |
| 2009/0252061 A1 | 10/2009 | Small |
| 2009/0252503 A1 | 10/2009 | Ishigami |
| 2009/0260083 A1 | 10/2009 | Szeto |
| 2009/0279558 A1 | 11/2009 | Davis |
| 2009/0292858 A1 | 11/2009 | Lambeth |
| 2009/0316721 A1 | 12/2009 | Kanda |
| 2009/0323698 A1 | 12/2009 | LeFaucheur |
| 2009/0323708 A1 | 12/2009 | Ihle |
| 2009/0327392 A1 | 12/2009 | Tripathi |
| 2009/0327462 A1 | 12/2009 | Adams |
| 2010/0002382 A1 | 1/2010 | Aybay |
| 2010/0027420 A1 | 2/2010 | Smith |
| 2010/0042869 A1 | 2/2010 | Szabo |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0085981 A1 | 4/2010 | Gupta |
| 2010/0097941 A1 | 4/2010 | Carlson |
| 2010/0103813 A1 | 4/2010 | Allan |
| 2010/0103939 A1 | 4/2010 | Carlson |
| 2010/0114818 A1 | 5/2010 | Lier |
| 2010/0131636 A1 | 5/2010 | Suri |
| 2010/0157844 A1 | 6/2010 | Casey |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0189119 A1 | 7/2010 | Sawada |
| 2010/0195489 A1 | 8/2010 | Zhou |
| 2010/0195529 A1 | 8/2010 | Liu |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0254703 A1 | 10/2010 | Kirkpatrick |
| 2010/0257263 A1 | 10/2010 | Casado |
| 2010/0258263 A1 | 10/2010 | Douxchamps |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0284698 A1 | 11/2010 | McColloch |
| 2010/0287262 A1 | 11/2010 | Elzur |
| 2010/0287548 A1 | 11/2010 | Zhou |
| 2010/0290464 A1 | 11/2010 | Assarpour |
| 2010/0290472 A1 | 11/2010 | Raman |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0329110 A1 | 12/2010 | Rose |
| 2010/0329265 A1 | 12/2010 | Lapuh |
| 2011/0007738 A1 | 1/2011 | Berman |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0051723 A1 | 3/2011 | Rabie |
| 2011/0055274 A1 | 3/2011 | Scales et al. |
| 2011/0058547 A1 | 3/2011 | Waldrop |
| 2011/0064086 A1 | 3/2011 | Xiong |
| 2011/0064089 A1 | 3/2011 | Hidaka |
| 2011/0072208 A1 | 3/2011 | Gulati |
| 2011/0085560 A1* | 4/2011 | Chawla ............. H04L 45/586 370/401 |
| 2011/0085562 A1 | 4/2011 | Bao |
| 2011/0085563 A1 | 4/2011 | Kotha |
| 2011/0088011 A1 | 4/2011 | Ouali |
| 2011/0110266 A1 | 5/2011 | Li |
| 2011/0134802 A1 | 6/2011 | Rajagopalan |
| 2011/0134803 A1 | 6/2011 | Dalvi |
| 2011/0134925 A1 | 6/2011 | Safrai |
| 2011/0142053 A1 | 6/2011 | Van Der Merwe |
| 2011/0142062 A1 | 6/2011 | Wang |
| 2011/0149526 A1 | 6/2011 | Turner |
| 2011/0158113 A1 | 6/2011 | Nanda |
| 2011/0161494 A1 | 6/2011 | McDysan |
| 2011/0161695 A1 | 6/2011 | Okita |
| 2011/0176412 A1 | 7/2011 | Stine |
| 2011/0188373 A1 | 8/2011 | Saito |
| 2011/0194403 A1 | 8/2011 | Sajassi |
| 2011/0194563 A1 | 8/2011 | Shen |
| 2011/0225540 A1 | 9/2011 | d'Entremont |
| 2011/0228767 A1 | 9/2011 | Singla |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268118 A1 | 11/2011 | Schlansker |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0273990 A1 | 11/2011 | Rajagopalan |
| 2011/0274114 A1 | 11/2011 | Dhar |
| 2011/0280572 A1 | 11/2011 | Vobbilisetty |
| 2011/0286357 A1 | 11/2011 | Haris |
| 2011/0286457 A1 | 11/2011 | Ee |
| 2011/0286462 A1 | 11/2011 | Kompella |
| 2011/0292947 A1 | 12/2011 | Vobbilisetty |
| 2011/0296052 A1* | 12/2011 | Guo et al. .................... 709/240 |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Da Silva |
| 2012/0033668 A1 | 2/2012 | Humphries |
| 2012/0033669 A1 | 2/2012 | Mohandas |
| 2012/0033672 A1 | 2/2012 | Page |

(56) References Cited

U.S. PATENT DOCUMENTS

| | | |
|---|---|---|
| 2012/0039163 A1 | 2/2012 | Nakajima |
| 2012/0042095 A1 | 2/2012 | Kotha |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0099863 A1 | 4/2012 | Xu |
| 2012/0102160 A1 | 4/2012 | Breh |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1 | 5/2012 | Roitshtein |
| 2012/0136999 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0170491 A1 | 7/2012 | Kern |
| 2012/0177039 A1 | 7/2012 | Berman |
| 2012/0210416 A1 | 8/2012 | Mihelich |
| 2012/0221636 A1 | 8/2012 | Surtani |
| 2012/0230225 A1 | 9/2012 | Matthews |
| 2012/0239918 A1 | 9/2012 | Huang |
| 2012/0243539 A1 | 9/2012 | Keesara |
| 2012/0250502 A1 | 10/2012 | Brolin |
| 2012/0260079 A1 | 10/2012 | Mruthyunjaya |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0287785 A1 | 11/2012 | Kamble |
| 2012/0294192 A1 | 11/2012 | Masood |
| 2012/0294194 A1 | 11/2012 | Balasubramanian |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003549 A1 | 1/2013 | Matthews |
| 2013/0003737 A1 | 1/2013 | Sinicrope |
| 2013/0003738 A1 | 1/2013 | Koganti |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0034094 A1 | 2/2013 | Cardona |
| 2013/0058354 A1 | 3/2013 | Casado |
| 2013/0066947 A1 | 3/2013 | Ahmad |
| 2013/0067466 A1 | 3/2013 | Combs |
| 2013/0070762 A1 | 3/2013 | Adams |
| 2013/0083693 A1 | 4/2013 | Himura |
| 2013/0097345 A1 | 4/2013 | Munoz |
| 2013/0114595 A1 | 5/2013 | Mack-Crane et al. |
| 2013/0124707 A1 | 5/2013 | Ananthapadmanabha |
| 2013/0127848 A1 | 5/2013 | Joshi |
| 2013/0132296 A1 | 5/2013 | Koppenhagen |
| 2013/0135811 A1 | 5/2013 | Dunwoody |
| 2013/0136123 A1 | 5/2013 | Ge |
| 2013/0148546 A1 | 6/2013 | Eisenhauer |
| 2013/0156425 A1 | 6/2013 | Kirkpatrick |
| 2013/0194914 A1 | 8/2013 | Agarwal |
| 2013/0219473 A1 | 8/2013 | Schaefer |
| 2013/0223221 A1 | 8/2013 | Xu |
| 2013/0223449 A1 | 8/2013 | Koganti |
| 2013/0250951 A1 | 9/2013 | Koganti |
| 2013/0250958 A1 | 9/2013 | Watanabe |
| 2013/0259037 A1 | 10/2013 | Natarajan |
| 2013/0266015 A1 | 10/2013 | Qu |
| 2013/0268590 A1 | 10/2013 | Mahadevan |
| 2013/0272135 A1 | 10/2013 | Leong |
| 2013/0294451 A1 | 11/2013 | Li |
| 2013/0297757 A1 | 11/2013 | Han |
| 2013/0301425 A1 | 11/2013 | Udutha et al. |
| 2013/0301642 A1 | 11/2013 | Radhakrishnan |
| 2013/0308492 A1 | 11/2013 | Baphna |
| 2013/0308647 A1 | 11/2013 | Rosset |
| 2013/0315125 A1 | 11/2013 | Ravishankar |
| 2013/0315586 A1 | 11/2013 | Kipp |
| 2013/0322427 A1 | 12/2013 | Stiekes |
| 2013/0332660 A1 | 12/2013 | Talagala |
| 2013/0336104 A1 | 12/2013 | Talla |
| 2013/0346583 A1 | 12/2013 | Low |
| 2014/0013324 A1 | 1/2014 | Zhang |
| 2014/0019608 A1 | 1/2014 | Kawakami |
| 2014/0025736 A1 | 1/2014 | Wang |
| 2014/0044126 A1 | 2/2014 | Sabhanatarajan |
| 2014/0050223 A1 | 2/2014 | Foo |
| 2014/0056298 A1 | 2/2014 | Vobbilisetty |
| 2014/0059225 A1 | 2/2014 | Gasparakis |
| 2014/0064056 A1 | 3/2014 | Sakata |
| 2014/0086253 A1 | 3/2014 | Yong |
| 2014/0105034 A1 | 4/2014 | Sun |
| 2014/0112122 A1 | 4/2014 | Kapadia |
| 2014/0140243 A1 | 5/2014 | Ashwood-Smith |
| 2014/0157251 A1 | 6/2014 | Hocker |
| 2014/0241147 A1 | 8/2014 | Rajagopalan |
| 2014/0258446 A1 | 9/2014 | Bursell |
| 2014/0269720 A1 | 9/2014 | Srinivasan |
| 2014/0269733 A1 | 9/2014 | Venkatesh |
| 2014/0298091 A1 | 10/2014 | Carlen |
| 2014/0355477 A1 | 12/2014 | Velayudhan et al. |
| 2015/0009992 A1 | 1/2015 | Zhang |
| 2015/0010007 A1 | 1/2015 | Matsuhira |
| 2015/0030031 A1 | 1/2015 | Zhou |
| 2015/0110111 A1 | 4/2015 | Song |
| 2015/0110487 A1 | 4/2015 | Fenkes |
| 2015/0127618 A1 | 5/2015 | Alberti |
| 2015/0143369 A1 | 5/2015 | Zheng |
| 2015/0172098 A1 | 6/2015 | Agarwal |
| 2015/0188753 A1 | 7/2015 | Anumala |
| 2015/0195093 A1 | 7/2015 | Mahadevan et al. |
| 2015/0222506 A1 | 8/2015 | Kizhakkiniyil |
| 2015/0248298 A1 | 9/2015 | Gavrilov |
| 2015/0263991 A1 | 9/2015 | MacChiano |
| 2015/0281066 A1 | 10/2015 | Koley |
| 2015/0301901 A1 | 10/2015 | Rath |
| 2015/0347468 A1 | 12/2015 | Bester |
| 2016/0072899 A1 | 3/2016 | Tung |
| 2017/0026197 A1 | 1/2017 | Venkatesh |

FOREIGN PATENT DOCUMENTS

| | | |
|---|---|---|
| CN | 101064682 | 10/2007 |
| CN | 101459618 | 6/2009 |
| CN | 101471899 | 7/2009 |
| CN | 101548511 | 9/2009 |
| CN | 101645880 | 2/2010 |
| CN | 102098237 | 6/2011 |
| CN | 102148749 | 8/2011 |
| CN | 102301663 | 12/2011 |
| CN | 102349268 | 2/2012 |
| CN | 102378176 | 3/2012 |
| CN | 102404181 | 4/2012 |
| CN | 102415065 | 4/2012 |
| CN | 102415065 A | 4/2012 |
| CN | 102801599 | 11/2012 |
| CN | 102801599 A | 11/2012 |
| CN | 102088388 | 4/2014 |
| EP | 0579567 | 5/1993 |
| EP | 0579567 A2 | 1/1994 |
| EP | 0993156 | 4/2000 |
| EP | 0993156 A2 | 12/2000 |
| EP | 1398920 | 3/2004 |
| EP | 1398920 A2 | 3/2004 |
| EP | 2001167 A1 | 8/2007 |
| EP | 1916807 A2 | 10/2007 |
| EP | 1916807 A2 | 4/2008 |
| EP | 2001167 A1 | 12/2008 |
| EP | 2854352 | 4/2015 |
| EP | 2874359 | 5/2015 |
| WO | 2008056838 | 5/2008 |
| WO | 2009042919 | 4/2009 |
| WO | 2010111142 | 9/2010 |
| WO | 2010111142 A1 | 9/2010 |
| WO | 2011132568 | 10/2011 |
| WO | 2011140028 | 11/2011 |

(56) References Cited

FOREIGN PATENT DOCUMENTS

| WO | 2011140028 A1 | 11/2011 |
|---|---|---|
| WO | 2012033663 | 3/2012 |
| WO | 2012093429 | 7/2012 |
| WO | 2014031781 | 2/2014 |

OTHER PUBLICATIONS

S. Night et al., "Virtual Router Redundancy Protocol", Network Working Group, XP-002135272, Apr. 1998.
Eastlake 3rd., Donald et al., "RBridges: TRILL Header Options", Draft-ietf-trill-rbridge-options-00.txt, Dec. 24, 2009.
J. Touch, et al., "Transparent Interconnection of Lots of Links (TRILL): Problem and Applicability Statement", May 2009.
Perlman, Radia et al., "RBridge VLAN Mapping", Draft-ietf-trill-rbridge-vlan-mapping-01.txt, Dec. 4, 2009.
Brocade Fabric OS (FOS) 6.2 Virtual Fabrics Feature Frequently Asked Questions.
Perlman, Radia "Challenges and Opportunities in the Design of TRILL: a Routed layer 2 Technology", XP-002649647, 2009.
Nadas, S. et al., "Virtual Router Redundancy Protocol (VRRP) Version 3 for IPv4 and IPv6", Mar. 2010.
Perlman, Radia et al., "RBridges: Base Protocol Specification", draft-ietf-trill-rbridge-protocol-16.txt, Mar. 3, 2010.
Lapuh, Roger et al., "Split Multi-link Trunking (SMLT) draft-lapuh-network-smlt-08", 2008.
"Switched Virtual Internetworking moves beyond bridges and routers", 8178 Data Communications 23(1994) September, No. 12, New York, pp. 66-70, 72, 74, 76, 78, 80.
Perlman, Radia et al., "RBridge VLAN Mapping", Dec. 4, 2003.
Perlman, Radia et al., "Challenges and Opportunities in the Design of TRILL: a Routed layer 2 Technology", 2009.
Perlman, Radia et al., "RBridges: Base Protocol Specification" <draft-ietf-trill-rbridge-protocol-16.txt>, 2010.
S. Nada, Ed et al., "Virtual Router Redundancy Protocol (VRRP) Version 3 for IPv4 and IPv6", Mar. 2010.
Lapuh, Roger et al., "Split Multi-link Trunking (SMLT)", Oct. 2002.
Knight, S. et al., "Virtual Router Redundancy Protocol", Apr. 1998.
Eastlake 3rd., Donald et al., "RBridges: TRILL Header Options", <draft-ietf-trill-rbridge-options-00.txt>, Dec. 2009.
Lapuh, Roger et al., "Split Multi-link Trunking (SMLT)", draft-lapuh-network-smlt-08, Jul. 2008.
Touch, J. et al., "Transparent Interconnection of Lots of Links (TRILL): Problem and Applicability Statement", May 2009.
Christensen, M. et al., "Considerations for Internet Group Management Protocol (IGMP) and Multicast Listener Discovery (MLD) Snooping Switches", May 2006.
U.S. Appl. No. 12/312,903 Office Action dated Jun. 13, 2013.
U.S. Appl. No. 13/365,808 Office Action dated Jul. 18, 2013.
U.S. Appl. No. 13/365,993 Office Action dated Jul. 23, 2013.
U.S. Appl. No. 13/092,873 Office Action dated Jun. 19, 2013.
U.S. Appl. No. 13/184,526 Office Action dated May 22, 2013.
U.S. Appl. No. 13/184,526 Office Action dated Jan. 28, 2013.
U.S. Appl. No. 13/050,102 Office Action dated May 16, 2013.
U.S. Appl. No. 13/050,102 Office Action dated Oct. 26, 2012.
U.S. Appl. No. 13/044,301 Office Action dated Feb. 22, 2013.
U.S. Appl. No. 13/044,301 Office Action dated Jun. 11, 2013.
U.S. Appl. No. 13/030,688 Office Action dated Apr. 25, 2013.
U.S. Appl. No. 13/030,806 Office Action dated Dec. 3, 2012.
U.S. Appl. No. 13/030,806 Office Action dated Jun. 11, 2013.
U.S. Appl. No. 13/098,360 Office Action dated May 31, 2013.
U.S. Appl. No. 13/092,864 Office Action dated Sep. 19, 2012.
U.S. Appl. No. 12/950,968 Office Action dated Jun. 7, 2012.
U.S. Appl. No. 12/950,968 Office Action dated Jan. 4, 2013.
U.S. Appl. No. 13/092,877 Office Action dated Mar. 4, 2013.
U.S. Appl. No. 12/950,974 Office Action dated Dec. 20, 2012.
U.S. Appl. No. 12/950,974 Office Action dated May 24, 2012.
U.S. Appl. No. 13/092,752 Office Action dated Feb. 5, 2013.
U.S. Appl. No. 13/092,752 Office Action dated Jul. 18, 2013.
U.S. Appl. No. 13/092,701 Office Action dated Jan. 28, 2013.
U.S. Appl. No. 13/092,701 Office Action dated Jul. 3, 2013.
U.S. Appl. No. 13/092,460 Office Action dated Jun. 21, 2013.
U.S. Appl. No. 13/042,259 Office Action dated Mar. 18, 2013.
U.S. Appl. No. 13/042,259 Office Action dated Jul. 31, 2013.
U.S. Appl. No. 13/092,580 Office Action dated Jun. 10, 2013.
U.S. Appl. No. 13/092,724 Office Action dated Jul. 16, 2013.
U.S. Appl. No. 13/092,724 Office Action dated Feb. 5, 2013.
U.S. Appl. No. 13/098,490 Office Action dated Dec. 21, 2012.
U.S. Appl. No. 13/098,490 Office Action dated Jul. 9, 2013.
U.S. Appl. No. 13/087,239 Office Action dated May 22, 2013.
U.S. Appl. No. 13/087,239 Office Action dated Dec. 5, 2012.
U.S. Appl. No. 12/725,249 Office Action dated Apr. 26, 2013.
U.S. Appl. No. 12/725,249 Office Action dated Sep. 12, 2012.
Brocade Unveils "The Effortless Network", http://newsroom.brocade.com/press-releases/brocade-unveils-the-effortless-network--nasdaq-brcd-0859535, 2012.
Foundry FastIron Configuration Guide, Software Release FSX 04.2.00b, Software Release FWS 04.3.00, Software Release FGS 05.0.00a, Sep. 26, 2008.
FastIron and TurboIron 24X Configuration Guide Supporting FSX 05.1.00 for FESX, FWSX, and FSX; FGS 04.3.03 for FGS, FLS and FWS; FGS 05.0.02 for FGS-STK and FLS-STK, FCX 06.0.00 for FCX; and TIX 04.1.00 for TI24X, Feb. 16, 2010.
FastIron Configuration Guide Supporting Ironware Software Release 07.0.00, Dec. 18, 2009.
"The Effortless Network: HyperEdge Technology for the Campus LAN", 2012.
Narten, T. et al. "Problem Statement: Overlays for Network Virtualization", draft-narten-nvo3-overlay-problem-statement-01, Oct. 31, 2011.
Knight, Paul et al., "Layer 2 and 3 Virtual Private Networks: Taxonomy, Technology, and Standardization Efforts", IEEE Communications Magazine, Jun. 2004.
"An Introduction to Brocade VCS Fabric Technology", Brocade white paper, http://community.brocade.com/docs/DOC-2954, Dec. 3, 2012.
Kreeger, L. et al., "Network Virtualization Overlay Control Protocol Requirements", Draft-kreeger-nvo3-overlay-cp-00, Jan. 30, 2012.
Louati, Wajdi et al., "Network-based virtual personal overlay networks using programmable virtual routers", IEEE Communications Magazine, Jul. 2005.
U.S. Appl. No. 13/092,877 Office Action dated Sep. 5, 2013.
U.S. Appl. No. 13/044,326 Office Action dated Oct. 2, 2013.
Huang, Nen-Fu et al. "An Effective Spanning Tree Algorithm for a Bridged LAN", Mar. 16, 1992.
Zhai, H. et al., "RBridge: Pseudo-Nickname draft-hu-trill-pseudonode-nickname-02.", May 15, 2012.
Narten, T. et al. "Problem Statement: Overlays for Network Virtualization draft-narten-nvo3-overlay-problem-statement-01", Oct. 31, 2011.
Knight, Paul et al. "Layer 2 and 3 Virtual Private Networks: Taxonomy, Technology, and Standardization Efforts", 2004.
An Introduction to Brocade VCS Fabric Technology, Dec. 3, 2012.
Kreeger, L. et al. "Network Virtualization Overlay Control Protocol Requirements draft-kreeger-nvo3-overlay-cp-00", Aug. 2, 2012.
Knight, Paul et al., "Network based IP VPN Architecture using Virtual Routers", May 2003.
Louati, Wajdi et al., "Network-Based Virtual Personal Overlay Networks Using Programmable Virtual Routers", 2005.
Brocade Unveils "The Effortless Network", 2009.
The Effortless Network: HyperEdge Technology for the Campus LAN, 2012.
Foundary FastIron Configuration Guide, Software Release FSX 04.2.00b, Software Release FWS 04.3.00, Software Release FGS 05.0.00a, 2008.
FastIron and TurbuIron 24x Configuration Guide, 2010.
FastIron Configuration Guide, Supporting IronWare Software Release 07.0.00, 2009.
Christensen, M. et al., Considerations for Internet Group Management Protocol (IGMP) and Multicast Listener Discovery (MLD) Snooping Switches, 2006.

(56) References Cited

OTHER PUBLICATIONS

Perlman, Radia et al. "RBridges: Base Protocol Specification", <draft-ietf-trill-rbridge-protocol-16.txt>, 2010.
Brocade Fabric OS (FOS) 6.2 Virtual Fabrics Feature Frequently Asked Questions, 2009.
Eastlake III, Donald et al., "RBridges: TRILL Header Options", 2009.
Perlman, Radia "Challenges and Opportunities in the Design of TRILL: a Routed layer 2 Technology", 2009.
Perlman, Radia et al., "RBridge VLAN Mapping", <draft-ietf-trill-rbridge-vlan-mapping-01.txt>, 2009.
Knight, S. et al., "Virtual Router Redundancy Protocol", 1998.
"Switched Virtual Internetworking moves beyond bridges and routers", 8178 Data Communications 23(1994) September, No. 12.
Touch, J. et al., "Transparent Interconnection of Lots of Links (TRILL): Problem and Applicability Statement", 2009.
Lapuh, Roger et al., "Split Multi-link Trunking (SMLT)", 2002.
Lapuh, Roger et al., "Split Multi-Link Trunking (SMLT) draft-Lapuh-network-smlt-08", 2009.
Nadas, S. et al., "Virtual Router Redundancy Protocol (VRRP) Version 3 for IPv4 and IPv6", 2010.
Office action dated Sep. 12, 2012, U.S. Appl. No. 12/725,249, filed Mar. 16, 2010.
Office action dated Apr. 26, 2012, U.S. Appl. No. 12/725,249, filed Mar. 16, 2010.
Office action dated Dec. 5, 2012, U.S. Appl. No. 13/087,239, filed Apr. 14, 2011.
Office action dated May 22, 2013, U.S. Appl. No. 13/087,239, filed Apr. 14, 2011.
Office action dated Dec. 21, 2012, U.S. Appl. No. 13/098,490, filed May 2, 2011.
Office action dated Jul. 9, 2013, U.S. Appl. No. 13/098,490, filed May 2, 2011.
Office action dated Mar. 27, 2014, U.S. Appl. No. 13/098,490, filed May 2, 2011.
Office action dated Feb. 5, 2013, U.S. Appl. No. 13/092,724, filed Apr. 22, 2011.
Office action dated Jul. 16, 2013, U.S. Appl. No. 13/092,724, filed Jul. 16, 2013.
Office action dated Jun. 10, 2013, U.S. Appl. No. 13/092,580, filed Apr. 22, 2011.
Office action dated Jan. 10, 2014, U.S. Appl. No. 13/092,580, filed Apr. 22, 2011.
Office action dated Mar. 18, 2013, U.S. Appl. No. 13/042,259, filed Mar. 7, 2011.
Office action dated Jan. 16, 2014, U.S. Appl. No. 13/042,259, filed Mar. 7, 2011.
Office action dated Jul. 31, 2013, U.S. Appl. No. 13/042,259, filed Mar. 7, 2011.
Office action dated Jun. 21, 2013, U.S. Appl. No. 13/092,460, filed Apr. 22, 2011.
Office action dated Jan. 28, 2013, U.S. Appl. No. 13/092,701, filed Apr. 22, 2011.
Office action dated Jul. 3, 2013, U.S. Appl. No. 13/092,701, filed Apr. 22, 2011.
Office action dated Feb. 15, 2013, U.S. Appl. No. 13/092,752, filed Apr. 22. 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Mar. 4, 2013, U.S. Appl. No. 13/092,877, filed Apr. 22, 2011.
Office action dated Sep. 5, 2013, U.S. Appl. No. 13/092,877, filed Apr. 22, 2011.
Office action dated Jan. 6, 2014, U.S. Appl. No. 13/092,877, filed Apr. 22, 2011.
Office action dated Jun. 20, 2014, U.S. Appl. No. 13/092,877, filed Apr. 22, 2011.
Office action dated Jun. 7, 2012, U.S. Appl. No. 12/950,968, filed Nov. 19, 2010.
Office action dated Jan. 4, 2013, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Oct. 2, 2013, U.S. Appl. No. 13/044,326, filed Mar. 9, 2011.
Office action dated Dec. 3, 2012, U.S. Appl. No. 13/030,806, filed Feb. 18, 2011.
Office action dated Jun. 11, 2013, U.S. Appl. No. 13/030,806, filed Feb. 18, 2011.
Office action dated Apr. 22, 2014, U.S. Appl. No. 13/030,806, filed Feb. 18, 2011.
Office action dated Apr. 25, 2013, U.S. Appl. No. 13/030,688, filed Feb. 18, 2011.
Office action dated Jun. 11, 2013, U.S. Appl. No. 13/044,301, filed Mar. 9, 2011.
Office action dated Feb. 22, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Jan. 28, 2013, U.S. Appl. No. 13/148,526, filed Jul. 16, 2011.
Office action dated May 22, 2013, U.S. Appl. No. 13/148,526, filed Jul. 16, 2011.
Office action dated Dec. 2, 2013, U.S. Appl. No. 13/184,526, filed Jul. 16, 2011.
Office action dated Jun. 19, 2013, U.S. Appl. No. 13/092,873, filed Apr. 22, 2011.
Office action dated Nov. 29, 2013, U.S. Appl. No. 13/092,873, filed Apr. 22, 2011.
Office action dated Jul. 23, 2013, U.S. Appl. No. 13/365,993, filed Feb. 3, 2012.
Office action dated Jul. 18, 2013, U.S. Appl. No. 13/365,808, filed Feb. 3, 2012.
Office action dated Mar. 6, 2014, U.S. Appl. No. 13/425,238, filed Mar. 20, 2012.
Office action dated Jun. 13, 2013, U.S. Appl. No. 13/312,903, filed Dec. 6, 2011.
Office action dated Nov. 12, 2013, U.S. Appl. No. 13/312,903, filed Dec. 6, 2011.
Office action dated Jun. 18, 2014, U.S. Appl. No. 13/440,861, filed Apr. 5, 2012.
Office action dated Feb. 28, 2014, U.S. Appl. No. 13/351,513, filed Jan. 17, 2012.
Office action dated May 9, 2014, U.S. Appl. No. 13/484,072, filed May 30, 2012.
Office action dated Oct. 21, 2013, U.S. Appl. No. 13/533,843, filed Jun. 26, 2012.
Office action dated May 14, 2014, U.S. Appl. No. 13/533,843, filed Jun. 26, 2012.
Office action dated Feb. 20, 2014, U.S. Appl. No. 13/598,204, filed Aug. 29, 2012.
Office action dated Jun. 6, 2014, U.S. Appl. No. 13/669,357, filed Nov. 5, 2012.
Office action dated Jul. 7, 2014, U.S. Appl. No. 13/044,326, filed Mar. 9, 2011.
Office Action dated Apr. 9, 2014, U.S. Appl. No. 13/092,752, filed Apr. 22, 2011.
Office Action dated Mar. 26, 2014, U.S. Appl. No. 13/092,701, filed Apr. 22, 2011.
Office Action dated Mar. 14, 2014, U.S. Appl. No. 13/092,460, filed Apr. 22, 2011.
Office Action dated Apr. 9, 2014, U.S. Appl. No. 13/092,724, filed Apr. 22, 2011.

(56) References Cited

OTHER PUBLICATIONS

Office Action for U.S. Appl. No. 13/425,238, filed Mar. 20, 2012, dated Mar. 6, 2014.
Office Action for U.S. Appl. No. 13/092,752, filed Apr. 22, 2011, dated Apr. 9, 2014.
Office Action for U.S. Appl. No. 13/598,204, filed Aug. 29, 2012, dated Feb. 20, 2014.
Office Action for U.S. Appl. No. 13/092,887 dated Jan. 6, 2014.
Perlman R: 'Challenges and opportunities in the design of TRILL: a routed layer 2 technology', 2009 IEEE GLOBECOM Workshops, Honolulu, HI, USA, Piscataway, NJ, USA, Nov. 30, 2009 (Nov. 30, 2009), pp. 1-6, XP002649647, DOI: 10.1109/GLOBECOM.2009. 5360776 ISBN: 1-4244-5626-0 [retrieved on Jul. 19, 2011].
Office Action for U.S. Appl. No. 13/365,993, filed Feb. 3, 2012, from Cho, Hong Sol., dated Jul. 23, 2013.
Office action dated Aug. 4, 2014, U.S. Appl. No. 13/050,102, filed Mar. 17, 2011.
Office Action for U.S. Appl. No. 13/030,806, filed Feb. 18, 2011, dated Dec. 3, 2012.
Office Action for U.S. Appl. No. 13/312,903, filed Dec. 6, 2011, dated Jun. 13, 2013.
Office Action for U.S. Appl. No. 13/092,873, filed Apr. 22, 2011, dated Nov. 29, 2013.
Office Action for U.S. Appl. No. 13/184,526, filed Jul. 16, 2011, dated Dec. 2, 2013.
Office Action for U.S. Appl. No. 13/098,490, filed May 2, 2011, dated Mar. 27, 2014.
TRILL Working Group Internet-Draft Intended status: Proposed Standard RBridges: Base Protocol Specificaiton Mar. 3, 2010.
Office Action for U.S. Appl. No. 13/742,207, filed Jan. 15, 2013.
Office Action for U.S. Appl. No. 13/351,513, filed Jan. 17, 2012, dated Jul. 24, 2014.
Office Action for U.S. Appl. No. 13/087,239, filed Apr. 14, 2011, dated Dec. 5, 2012.
Office Action for U.S. Appl. No. 13/030,688, filed Feb. 18, 2011, dated Jul. 17, 2014.
Office Action for U.S. Appl. No. 13/044,326, filed Mar. 9, 2011, dated Jul. 7, 2014.
Office Action for U.S. Appl. No. 13/556,061, filed Jul. 23, 2012, dated Jun. 6, 2014.
Office Action for U.S. Appl. No. 13/092,877, filed Apr. 22, 2011, dated Jun. 20, 2014.
Office Action for U.S. Appl. No. 13/092,873, filed Apr. 22, 2011, dated Jul. 25, 2014.
Office Action for U.S. Appl. No. 13/312,903, filed Dec. 6, 2011, dated Aug. 7, 2014.
Office Action for U.S. Appl. No. 13/950,974, filed Nov. 19, 2010, dated Dec. 2, 2012.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Office action dated Jun. 8, 2015, U.S. Appl. No. 14/178,042, filed Feb. 11, 2014.
Office action dated Oct. 2, 2014, for U.S. Appl. No. 13/092,752, filed Apr. 22, 2011.
Office Action dated Dec. 19, 2014, for U.S. Appl. No. 13/044,326, filed Mar. 9, 2011.
Office Action dated May 21, 2015, U.S. Appl. No. 13/288,822, filed Nov. 3, 2011.
Office action dated Apr. 30, 2015, U.S. Appl. No. 13/351,513, filed Jan. 17, 2012.
Office Action dated Apr. 1, 2015 U.S. Appl. No. 13/656,438 filed Oct. 19, 2012.
Office Action Dated Jun. 10, 2015, U.S. Appl. No. 13/890,150, filed May 8, 2013.
Kompella, Ed K. et al., 'Virtual Private LAN Service (VPLS) Using BGP for Auto-Discovery and Signaling' Jan. 2007.

Mahalingam "VXLAN: A Framework for Overlaying Virtualized Layer 2 Networks over Layer 3 Networks" Oct. 17, 2013 pp. 1-22, Sections 1, 4 and 4.1.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/044,301, dated Mar. 9, 2011.
Office Action for U.S. Appl. No. 13/050,102, filed Mar. 17, 2011, dated Jan. 26, 2015.
Office Action for U.S. Appl. No. 13/092,460, filed Apr. 22, 2011, dated Mar. 13, 2015.
Office Action for U.S. Appl. No. 13/092,752, filed Apr. 22, 2011, dated Feb. 27, 2015.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Office Action for U.S. Appl. No. 13/184,526, filed Jul. 16, 2011, dated Jan. 5, 2015.
Office Action for U.S. Appl. No. 13/425,238, filed Mar. 20, 2012, dated Mar. 12, 2015.
Office Action for U.S. Appl. No. 13/598,204, filed Aug. 29, 2012, dated Jan. 5, 2015.
Office Action for U.S. Appl. No. 13/669,357, filed Nov. 5, 2012, dated Jan. 30, 2015.
Office Action for U.S. Appl. No. 13/786,328, filed Mar. 5, 2013, dated Mar. 13, 2015.
Office Action for U.S. Appl. No. 13/851,026, filed Mar. 26, 2013, dated Jan. 30, 2015.
Office Action for U.S. Appl. No. 14/577,785, filed Dec. 19, 2014, dated Apr. 13, 2015.
Rosen, E. et al., "BGP/MPLS VPNs", Mar. 1999.
Siamak Azodolmolky et al. "Cloud computing networking: Challenges and opportunities for innovations", IEEE Communications Magazine, vol. 51, No. 7, Jul. 1, 2013.
Office Action dated Jun. 18, 215, U.S. Appl. No. 13/098,490, filed May 2, 2011.
Office Action dated Jun. 16, 2015, U.S. Appl. No. 13/048,817, filed Mar. 15, 2011.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438, filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Open Flow Switch Specification Version 1.2 Dec. 5, 2011.
Office action dated Feb. 2, 2016, U.S. Appl. No. 13/092,460, filed Apr. 22, 2011.

(56) References Cited

OTHER PUBLICATIONS

Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.
Office Action dated Jul. 6, 2016, U.S. Appl. No. 14/618,941, filed Feb. 10, 2015.
Office Action dated Jul. 20, 2016, U.S. Appl. No. 14/510,913, filed Oct. 9, 2014.
Office Action dated Jul. 29, 2016, U.S. Appl. No. 14/473,941, filed Aug. 29, 2014.
Office Action dated Jul. 28, 2016, U.S. Appl. No. 14/284,212, filed May 21, 2016.
Office Action dated Jan. 31, 2017, U.S. Appl. No. 13/184,526, filed Jul. 16, 2011.
Office Action dated Jan. 27, 2017, U.S. Appl. No. 14/216,292, filed Mar. 17, 2014.
Office Action dated Jan. 26, 2017, U.S. Appl. No. 13/786,328, filed Mar. 5, 2013.
Office Action dated Dec. 2, 2016, U.S. Appl. No. 14/512,268, filed Oct. 10, 2014.
Office Action dated Dec. 1, 2016, U.S. Appl. No. 13/899,849, filed May 22, 2013.
Office Action dated Dec. 1, 2016, U.S. Appl. No. 13/656,438, filed Oct. 19, 2012.
Office Action dated Nov. 30, 2016, U.S. Appl. No. 13/598,204, filed Aug. 29, 2012.
Office Action dated Nov. 21, 2016, U.S. Appl. No. 13/669,357, filed Nov. 5, 2012.
Office Action dated Feb. 8, 2017, U.S. Appl. No. 14/473,941, filed Aug. 29, 2014.
Office Action dated Feb. 8, 2017, U.S. Appl. No. 14/822,380, filed Aug. 10, 2015.
"Network based IP VPN Architecture using Virtual Routers" Paul Knight et al.
Yang Yu et al "A Framework of using OpenFlow to handle transient link failure", TMEE, 2011 International Conference on, IEEE, Dec. 16, 2011.
Office Action for U.S. Appl. No. 15/227,789 dated Feb. 27, 2017.
Office Action for U.S. Appl. No. 14/822,380 dated Feb. 8, 2017.
Office Action for U.S. Appl. No. 14/704,660 dated Feb. 27, 2017.
Office Action for U.S. Appl. No. 14/510,913 dated Mar. 3, 2017.
Office Action for U.S. Appl. No. 14/473,941 dated Feb. 8, 2017.
Office Action for U.S. Appl. No. 14/329,447 dated Feb. 10, 2017.
Office Action for U.S. Appl. No. 14/817,097 dated May 4, 2017.
Office Action for U.S. Appl. No. 14/872,966 dated Apr. 20, 2017.
Office Action for U.S. Appl. No. 14/680,915 dated May 3, 2017.
Office Action for U.S. Appl. No. 14/792,166 dated Apr. 26, 2017.
Office Action for U.S. Appl. No. 14/660,803 dated May 17, 2017.
Office Action for U.S. Appl. No. 14/488,173 dated May 12, 2017.
Office Action for U.S. Appl. No. 14/662,095 dated Mar. 24, 2017.
Office Action for U.S. Appl. No. 15/005,967 dated Mar. 31, 2017.
Office Action for U.S. Appl. No. 15/215,377 dated Apr. 7, 2017.
Office Action for U.S. Appl. No. 13/098,490 dated Apr. 6, 2017.
Office Action for U.S. Appl. No. 14/662,092 dated Mar. 29, 2017.
Office Action for U.S. Appl. No. 13/288,822, dated May 26, 2017.
Office Action for U.S. Appl. No. 14/329,447, dated Jun. 8, 2017.

* cited by examiner

SYSTEM AND METHOD FOR NETWORK CONFIGURATION

RELATED APPLICATIONS

This application claims the benefit of U.S. Provisional Application No. 61/364,941, entitled "CONFIGURATION ORCHESTRATION INFRASTRUCTURE," by inventors Shiv Haris and Suresh Vobbilisetty, filed 16 Jul. 2010, the disclosure of which is incorporated by reference herein.

The present disclosure is related to U.S. patent application Ser. No. 13/042,259, entitled "PORT PROFILE MANAGEMENT FOR VIRTUAL CLUSTER SWITCHING," by inventors Dilip Chatwani, Suresh Vobbilisetty, and Phanidhar Koganti, filed 7 Mar. 2010, the disclosure of which is incorporated by reference herein.

BACKGROUND

Field

The present disclosure relates to network design. More specifically, the present disclosure relates to a method and system for managing configuration of devices in a network.

Related Art

The relentless growth of the Internet has brought with it an insatiable demand for bandwidth. As a result, equipment vendors race to build larger, faster, and more versatile switches to move traffic. However, the size of a switch cannot grow infinitely. It is limited by physical space, power consumption, and design complexity, to name a few factors. More importantly, because an overly large system often does not provide economy of scale due to its complexity, simply increasing the size and throughput of a switch may prove economically unviable due to the increased per-port cost.

One way to increase the throughput of a switch system is to use switch stacking. In switch stacking, multiple smaller-scale, identical switches are interconnected in a special pattern to form a larger logical switch. However, switch stacking requires careful configuration of the ports and inter-switch links. The amount of required manual configuration becomes prohibitively complex and tedious when the stack reaches a certain size, which precludes switch stacking from being a practical option in building a large-scale switching system. Furthermore, a system based on stacked switches often has topology limitations which restrict the scalability of the system due to fabric bandwidth considerations.

In addition, modern-day datacenters often include heterogeneous servers, switches, and storage devices manufactured by different vendors. Configuration changes on one of these devices usually result in configuration changes at other devices. It is conceivable that a change at a device may create a cascade of changes across a number of datacenter devices. Furthermore, the evolution of virtual computing has placed additional requirements on the network. For example, as the locations of virtual servers become more mobile and dynamic, it is often desirable that the network configuration can respond to these changes in a timely fashion. However, at present, there are no readily applicable solutions that can achieve this goal without using proprietary communication protocols.

SUMMARY

One embodiment of the present invention provides a network device that facilitates configuration orchestration. During operation, the system interprets a configuration command and initiates a set of business logic. The business logic can be triggered by the configuration command, a local condition, or both. Furthermore, the system configures the switch according to an outcome of the business logic.

In a variation on this embodiment, the configuration command is encapsulated in a Web service message.

In a variation on this embodiment, while interpreting the configuration command, the system interprets a Web Service Description Language message.

In a variation on this embodiment, the business logic specifies one or more of: a local configuration operation, a condition for performing a local configuration, a query to a virtual machine managing system, and a command to a data center.

In a further variation, the business logic is written in script language based on PHP, Python, Perl, or Java.

In a variation on this embodiment, the system triggers the business logic in response to detecting a local connectivity change.

In a variation on this embodiment, the system interprets a user command to modify the business logic.

In a variation on this embodiment, business logic comprises a function for auditing configuration information associated with the switch or a remote device.

DETAILED DESCRIPTION

Figure 1:
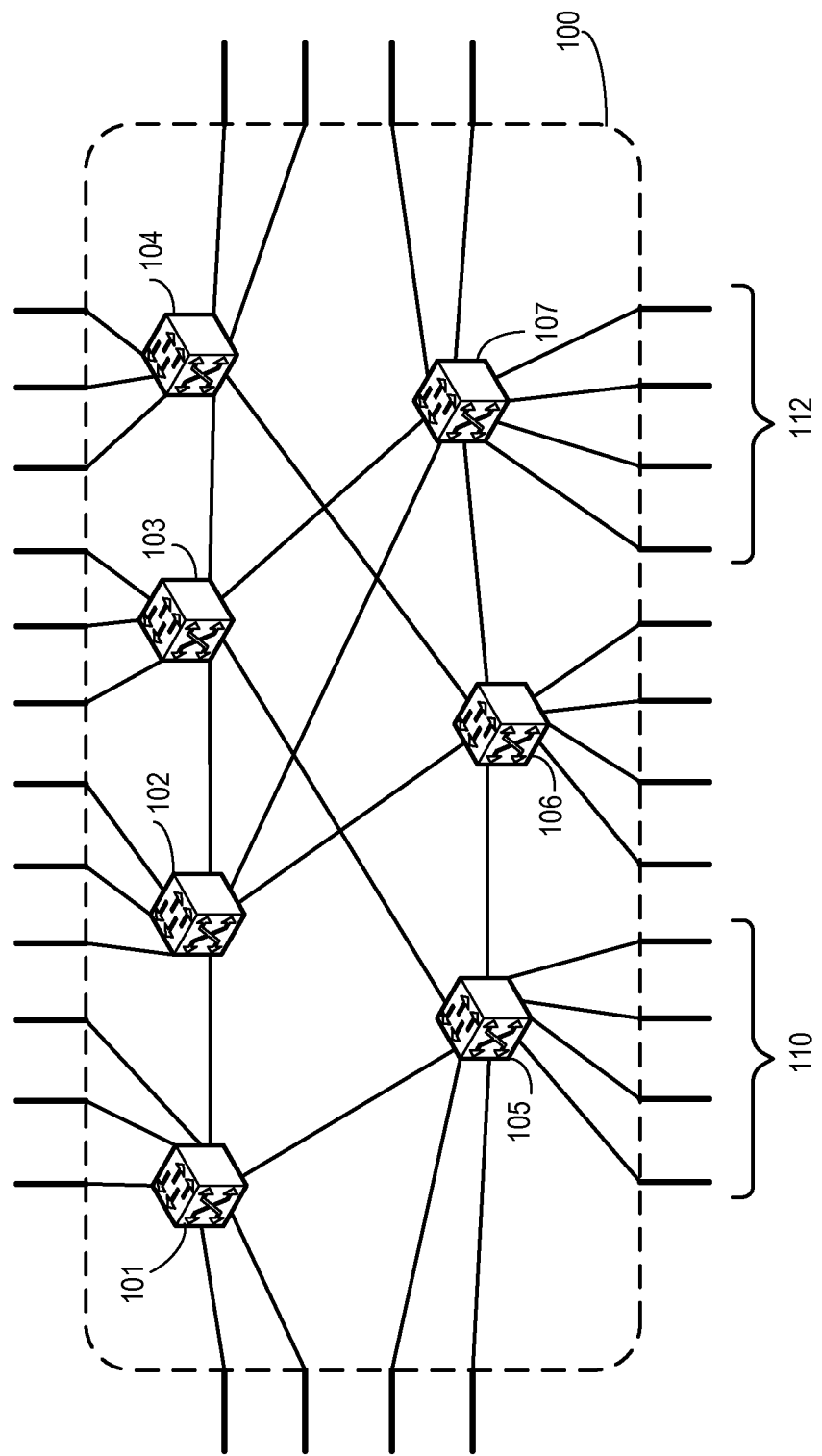
FIG. 1 illustrates an exemplary fabric system that facilitates configuration orchestration, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of coordinating configuration of a number of network devices in a datacenter is solved by facilitating an open management interface and a set of business logic on a respective device. The open management interface allows a device to query configuration states on other devices, as well as initiate local or remote configuration changes. In addition, the business logic stored on a respective device allows configuration changes to take place in an intelligent and coordinated fashion, thereby allowing coherent interoperation among various network devices. In general, the business logic stored in multiple devices collectively forms the overall intelligence of the datacenter or a subset thereof (or any general network).

In addition, the business logic within a network device may also be used to audit the configuration of the network device. Auditing does not change the configuration, but involves querying and verifying the configuration. Auditing may also involve querying another device and/or database.

The audit business logic can also reside on an entity that is separate from the network devices. This separate entity can trigger audits on the network devices and gather resulting audit information. This audit information collected from multiple can then be analyzed to audit and verify the configuration of the datacenter or a subset thereof.

In some embodiments, the open management interface is a Web service interface. This open interface, which is provided on a number of participating devices, forms a logical "bus," meaning that any device can communicate with any other device on a common communication channel, via Web service. This logical bus also allows seamless communication with virtual machine management systems (such as the vCenter by VMware) as well as other devices. Within each device, the business logic can implement complex configuration intelligence and trigger additional configuration changes (in both the local device and a remote device) in response to a received command. In the following description, such inter-related configuration maneuvers across multiple devices are referred to as "configuration orchestration."

In this disclosure, a number of examples are provided in the context of a fabric switching system, which is a logical switch formed by a number of individual, physical switches (referred to as "fabric switch," "virtual cluster switch," or VCS). However, the general concept of configuration orchestration disclosed herein is not limited to a particular type of switching system. The same idea can be implemented in a stand-alone switch, an end host, a virtual machine, a datacenter management system, or a virtual machine management system. In fact, the general configuration-orchestration mechanism can be implemented on any datacenter device (or any networked device in general).

In this disclosure, the term "orchestrator" refers to a device that triggers a command on another device based on a set of business logic local to itself. An "orchestrated" device refers to a device that intelligently changes its local configuration state based on its local business logic in response to a command received from another device. Note that "orchestrator" and "the orchestrated" are both relative terms. A device can be both an orchestrator and orchestrated.

Since the orchestrator and the orchestration functions can be in any device, a command triggered at one device can result in further initiation of new set of commands at other devices. Each network device based on its business logic will query configuration information from its surrounding network devices, modify its own configuration and trigger commands further to other network devices. This process will stop at some point and the resulting configuration will be the new configuration of the datacenter or a subset thereof.

It is possible that due to some unforeseeable situation the configuration may not exactly be what is desired—a provisioning of audit capability could also be built using this orchestration infrastructure. This audit mechanism is in addition to the mechanism for configuration management described above.

The terms "virtual cluster switch," "virtual cluster switching," and "VCS" refer to a group of interconnected physical switches operating as a single logical switch. The control plane for these physical switches provides the ability to automatically configure a given physical switch, so that when it joins the VCS, little or no manual configuration is required.

The terms "frame" or "packet" refer to a group of bits that can be transported together across a network. "Frame" should not be interpreted as limiting embodiments of the present invention to layer-2 networks. "Packet" should not be interpreted as limiting embodiments of the present invention to layer-3 networks. "Frame" or "packet" can be replaced by other terminologies referring to a group of bits, such as "cell" or "datagram."

Fabric Switch Architecture

FIG. 1 illustrates an exemplary fabric switch system which facilitates configuration orchestration, in accordance with an embodiment of the present invention. In this example, a fabric switch system 100 includes physical switches 101, 102, 103, 104, 105, 106, and 107. A given physical switch runs an Ethernet-based transport protocol on its ports (e.g., TRILL on its inter-switch ports, and Ethernet transport on its external ports), while its control plane can run on a different protocol stack, such an FC switch fabric protocol stack. The transport protocol facilitates transport of Ethernet frames within and across VCS 100 in a routed fashion. The control-plane protocol stack facilitates the automatic configuration of individual physical switches, in a way similar to how a conventional FC switch fabric is formed and automatically configured. In one embodiment, fabric switch system 100 can appear externally as an ultra-high-capacity Ethernet switch. More details on FC network architecture, protocols, naming/address conventions, and various standards are available in the documentation available from the NCITS/ANSI T11 committee (www.t11.org) and publicly available literature, such as "Designing Storage Area Networks," by Tom Clark, 2nd Ed., Addison Wesley, 2003, the disclosures of which are incorporated by reference in their entirety herein.

A physical switch may dedicate a number of ports for external use (i.e., to be coupled to end hosts or other switches external to the fabric switch system) and other ports for inter-switch connection. Viewed externally, fabric switch system 100 appears to be one switch to a device from the outside, and any port from any of the physical switches is considered one port on the fabric switch. For example, port groups 110 and 112 are both external ports and can be treated equally as if they were ports on a common physical switch, although switches 105 and 107 may reside in two different locations.

The physical switches can reside at a common location, such as a data center or central office, or be distributed in different locations. Hence, it is possible to construct a large-scale centralized switching system using many smaller, inexpensive switches housed in one or more chassis at the same location. It is also possible to have the physical switches placed at different locations, thus creating a logical switch that can be accessed from multiple locations. The topology used to interconnect the physical switches can also be versatile. Fabric switch system 100 is based on a mesh topology. In further embodiments, a fabric switch can be based on a ring, fat tree, or other types of topologies.

In one embodiment, the protocol architecture of a fabric switch is based on elements from the standard IEEE 802.1Q Ethernet bridge, which is emulated over a transport based on the Fibre Channel Framing and Signaling-2 (FC-FS-2) standard. The resulting switch is capable of transparently switching frames from an ingress Ethernet port from one of the edge switches to an egress Ethernet port on a different edge switch through the fabric switch.

In one embodiment, each member switch provides a Web service-based interface that facilitates communication of network management information with any other devices in the datacenter or coupled to the fabric switch. Via this interface, a device can query the configuration state of another device, initiate a local configuration change, or initiate a remote configuration change.

Because of its automatic configuration capability, a fabric switch can be dynamically expanded as the network demand increases. In addition, one can build a large-scale switch using many smaller physical switches without the burden of manual configuration. For example, it is possible to build a high-throughput fully non-blocking switch using a number of smaller switches. This ability to use small switches to build a large non-blocking switch significantly reduces the cost associated switch complexity.

Automatic Port Profile Management

Today's server virtualization infrastructure (e.g. a Hypervisor, also called virtual machine monitor) associates a server side (e.g. Hypervisor or adapter) Virtual Ethernet Bridge (VEB) port profile to each Ethernet MAC address used by a virtual machine (VM) to access the network through a VEB port. Examples of the VEB's port profile attributes includes: the types of frames allowed on the port (e.g. all frames, only frames tagged with certain VLAN values, or untagged frames), the VLAN identifiers that are allowed to be used, and rate limiting attributes (e.g. port or access-control based rate limits). In today's server virtualization infrastructure, if the VM migrates from one physical server to another, the VEB's port profile migrates with it. In other words, today's server virtualization infrastructure provides automated port profile migration of the server's VEB port(s) that are associated with a VM.

However, in existing technologies, there remains a gap between the access and Quality of Service (QoS) controls supported in external layer 2 switches and server virtualization infrastructure. That is, external layer 2 switches have more advanced controls compared to server VEB implementations. Although server virtualization infrastructure is continually adding these controls, this gap is expected to remain. Some environments prefer the more advanced controls provided by external network switches. An example of such an environment is a multi-tier data center that has several types of applications, each with differing advanced network controls, running over the same layer-2 network. In this type of environment the network administrator often prefers the use of advanced access controls available in external switches.

Today's layer-2 networks do not provide a mechanism for automatically migrating switch access and traffic controls associated with an end-point device (e.g., a VM), when that device migrates from one switch to another. The migration may be physical, such as an Operating System image (application, middleware, Operating System and associated state) that is running on one physical system and is migrated to another system. The migration may be also be virtual, such as an Operating System image (OS image) that is running over a Hypervisor on one system and is migrated to run over a Hypervisor on another system.

Embodiments of the present invention provides a mechanism for automatically migrating port profiles resident in a switch and associated with an OS image to a port on a second switch, when that OS image migrates from one physical end-host system to another end-host system, which is attached to the second switch.

Figure 2:
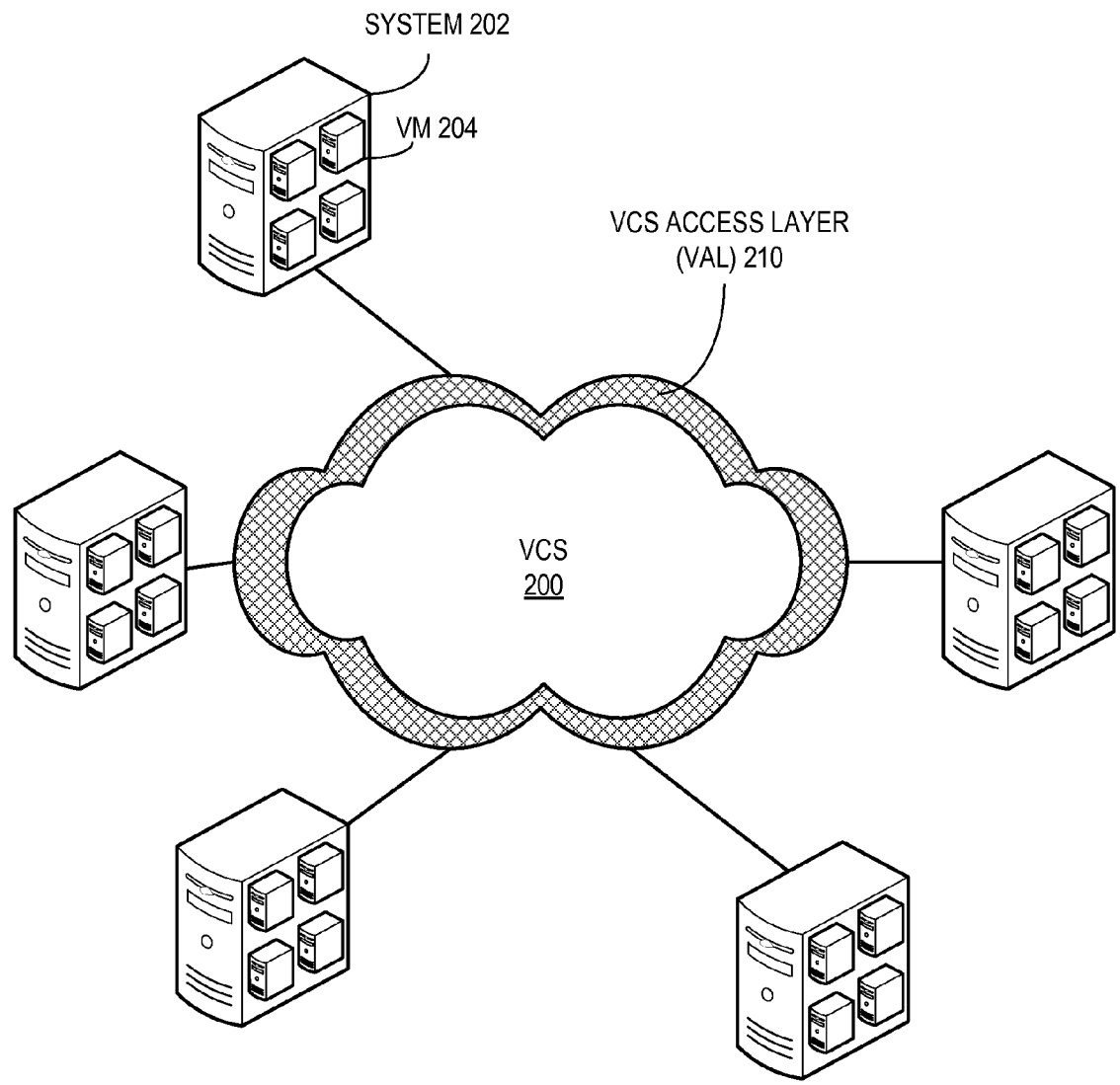
FIG. 2 illustrates a logical VCS access layer (VAL) which includes an automatic port profile manager, in accordance with one embodiment of the present invention.

FIG. 2 illustrates a logical VCS access layer (VAL) which includes an automatic port profile manager, in accordance with one embodiment of the present invention. In this example, a fabric switch (VCS) 200 is coupled with a number of physical server systems, such as system 202. Each physical server system runs a number of VMs. For example, system 202 includes four VMs, one of which is VM 204. A VM may be dedicated to a certain application (e.g., instant messaging services, directory services, data base applications, etc.) and may have its own requirement on the network. A VM running mission-critical applications may require a separate VLAN within VCS 200 and may have more strict QoS requirement (such as guaranteed port bandwidth, low latency, and guaranteed packet delivery). A VM running non-critical applications may have much lower requirements.

The switches within VCS 200 which are coupled externally to the physical end-host systems form a logical VCS access layer (VAL) 210. The automatic migration of port profiles (AMPP) is implemented in VAL 210. During operation, various port profiles, which are often tailored to different requirements of the VMs, are created and distributed to all the member switches in VCS 200. As described in detail below, when the packets generated by a VM are detected by an ingress member switch of VCS 200, the VM's source MAC address is recognized and used to identify the corresponding port profile, which is then applied to the appropriate ingress switch port. When a VM moves from one physical server to another, the MAC-address detection mechanism can quickly identify the new physical switch port to which the VM is coupled to, and apply the same port profile to the new port.

Figure 3:
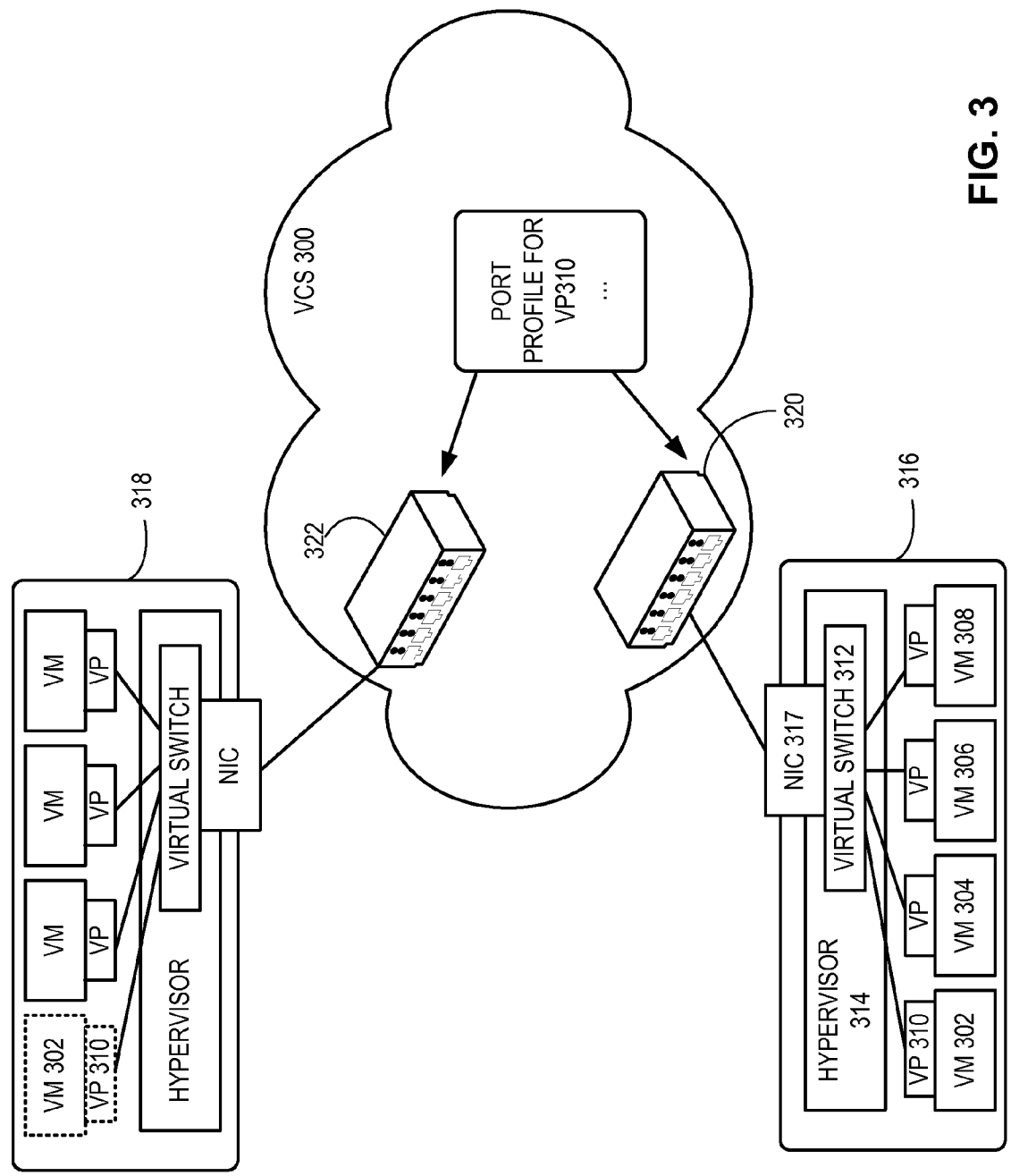
FIG. 3 illustrates an example of the operation of automatic migration of port profiles (AMPP), in accordance with one embodiment of the present invention

FIG. 3 illustrates an example of the operation of advanced management of port profile (AMPP), in accordance with one embodiment of the present invention. In this example, a fabric switch (VCS) 300 includes two switches 320 and 322, which are coupled to two physical servers, 316 and 318, respectively. Physical server 316 hosts four VMs, 302, 304, 306, and 308. Each VM has a virtual port (VP, or virtual network interface card, VNIC). For example, VM 302 has a VP 310. A respective VP is assigned a virtual MAC address. The four VPs are logically coupled to a virtual switch 312 which is provided by a hypervisor 314. Virtual switch 312 is responsible for dispatching outgoing and incoming traffic through a physical NIC 317. Note that an Ethernet frame generated by a respective VM has the virtual MAC of the corresponding VP as its source address. Logically, virtual switch 312 functions as an aggregation point that provides a link to the ingress member switch in VCS 300. Physical server 318 has a similar architecture. During operation, a VM can migrate from one physical server to another (e.g., "VMotion" function provided by VMware). This migration can be event-driven or pre-scheduled. Such migration is often used to cope with changing dynamics in a number of parameters, such as server load, power consumption, resource utilization, etc.

During operation, one or more port profiles can be created to specify a number of requirements/restrictions/limitations that should be enforced at a VCS switch port corresponding to one or more VMs. For example, a port profile for VM 302 (which can be identified by the virtual MAC address of VP 310) can be created and distributed to every member switch of VCS 300. When VM 302 sends its first Ethernet frame to the network, switch 320 would learn this source MAC address. Upon learning VP 310's MAC address, switch 320 then searches its port profile database and identifies the matching port profile. Subsequently, the identified port profile is applied to the port on switch 320 which is coupled to system 316. In addition, the same port profile is applied to the port where the matching MAC address is the destination MAC address of a frame. This way, the same network parameters are enforced at both ingress and egress ports of the VCS. Note that the port profile might include "soft" parameters. In other words, the requirements and limitations in the port profile may be specific to certain MAC addresses, and may not be "hard" limitations on the physical parameters of the switch port, since traffic from/to multiple VMs is handled by the same physical switch port.

In one embodiment, VCS 300 provides a mechanism that distributes all the port profiles and the port-profile-to-MAC mapping information to all the member switches. The port profiles can be created using a command line interface (CLI) or other network management software. In addition, upon migration of a VM (such as a VMware VMotion), the target switch port in the VCS can automatically activate the correct port profile configuration.

Figure 4A:
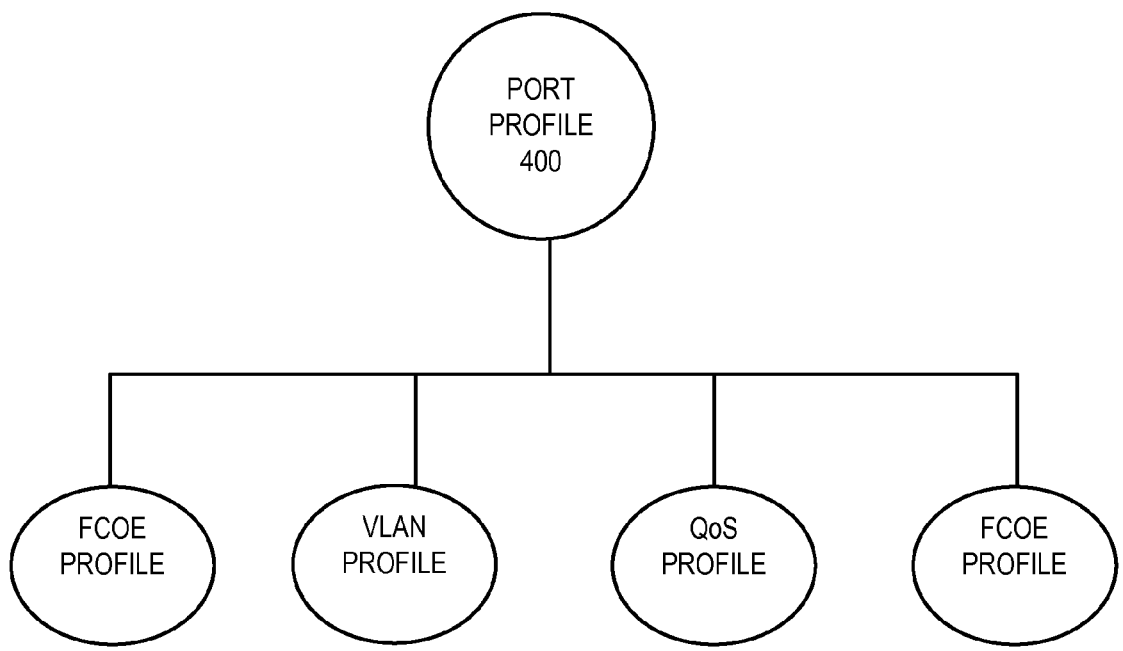
FIG. 4A illustrates exemplary port profile contents, in accordance with one embodiment of the present invention.

FIG. 4A illustrates exemplary port profile contents, in accordance with one embodiment of the present invention. As shown in FIG. 4A, a port profile can contain the entire configuration needed for a VM to gain access to a LAN or WAN, which can include: Fibre Channel over Ethernet (FCoE) configuration, VLAN configuration, QoS related configuration, and security related configuration (such as access control lists, ACLs). The list above is by no means complete or exhaustive. Furthermore, it is not necessary that a port profile contains every type of configuration information.

In one embodiment, a port profile can be capable of operating as a self contained configuration container. In other words, if a port profile is applied to a new switch without any additional configuration, the port profile should be sufficient to set the switch's global and local (interface level) configuration and allow the switch to start carrying traffic.

A VLAN configuration profile within a port profile can define:
a VLAN membership which includes tagged VLANs and an untagged VLAN; and
ingress/egress VLAN filtering rules based on the VLAN membership.

A QoS configuration profile within a port profile can define:
mapping from an incoming frame's 802.1p priority to internal queue priority; (if the port is in QoS untrusted mode, all incoming frame's priorities would be mapped to the default best-effort priority)
mapping from an incoming frame's priority to outgoing priority;
scheduling profile, such as weighted Round-Robin or strict-priority based queuing;
mapping of an incoming frame's priority to strict-priority based or weighted Round-Robin traffic classes;
flow control mechanisms on a strict-priority based or weight Round-Robin traffic class; and
limitations on multicast data rate.

An FCoE configuration profile within a port profile defines the attributes needed for the port to support FCoE, which can include:
FCoE VLAN;
FCMAP;
FCoE Priority; and
virtual Fabric ID.

A security configuration profile within a port profile defines the security rules needed for the server port. However, the security rules can be different at different ports, so some of the locally configured ACLs can be allowed to override conflicting rules from a port profile. A typical security profile can contain the following attributes:
Enable 802.1x with EAP TLV extensions for VM mobility; and
MAC based standard and extended ACLs.

Figure 4B:
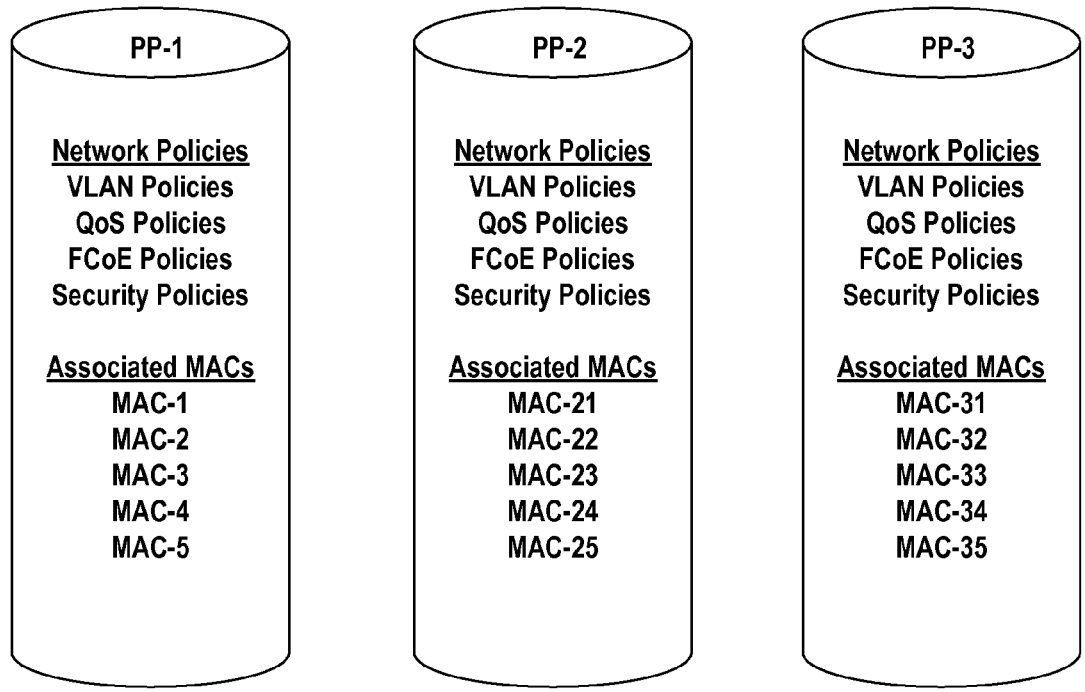
FIG. 4B illustrates three exemplary port profiles, in accordance with on embodiment of the present invention.

In one embodiment, each port profile can have one or more MAC addresses associated with it. FIG. 4B illustrates three exemplary port profiles, in accordance with on embodiment of the present invention. In this example, port profile PP-1 is associated with 5 MAC addresses. These MAC address can be virtual MAC addresses assigned to different VMs. The port-profile-to-MAC mapping information is distributed throughout the VCS. A port profile can be activated on a server port in three ways: (1) when a hypervisor binds a MAC address to a port profile ID; (2) through regular MAC learning; and (3) through a manual configuration process via a management interface.

Figure 5:
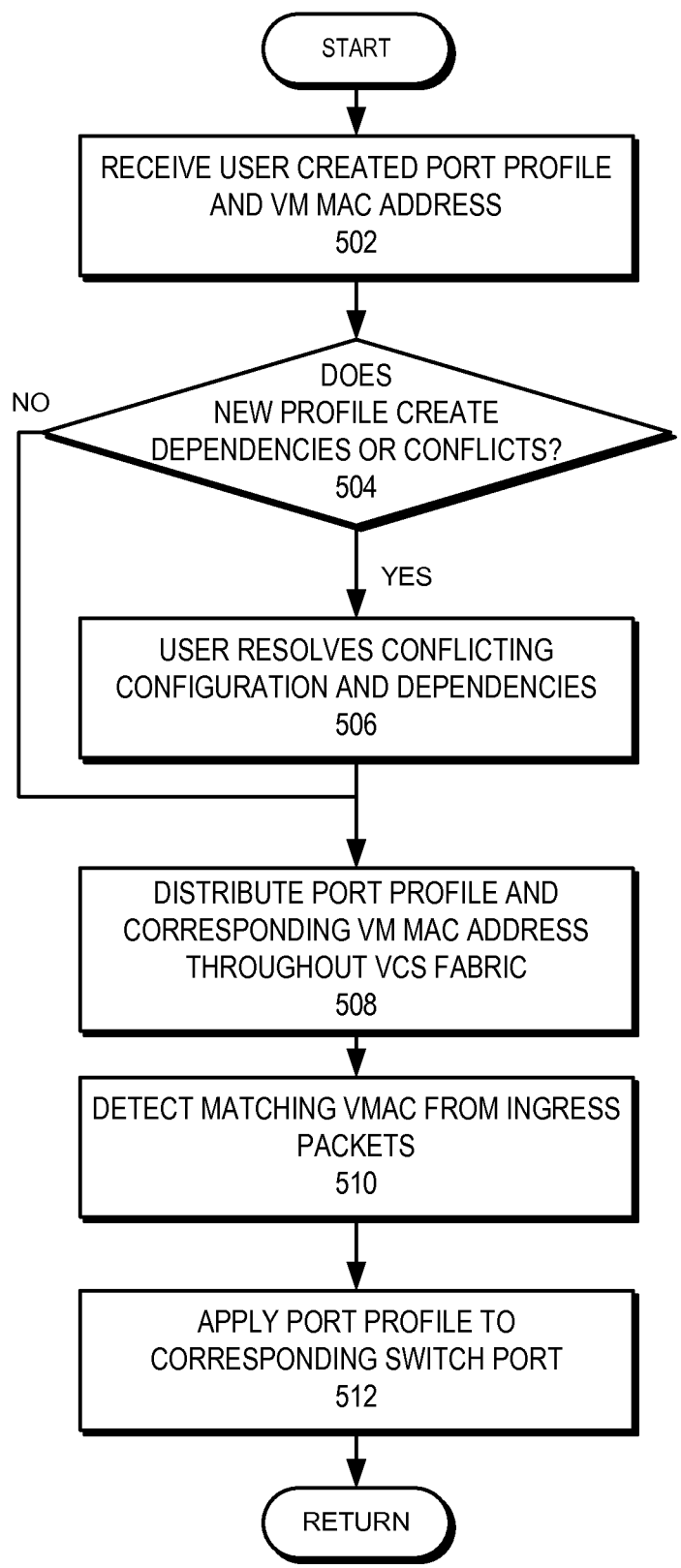
FIG. 5 presents a flowchart illustrating the process of creating and applying a port profile, in accordance with one embodiment of the present invention.

FIG. 5 presents a flowchart illustrating the process of creating and applying a port profile, in accordance with one embodiment of the present invention. During operation, the system receives a user created port profile with the corresponding VM's MAC address (operation 502). This MAC address is then associated with the port profile and can be later used to identify the profile. The system then determines whether the new profile creates dependencies on other existing profiles or conflicts (operation 504). If so, the system allows the user to resolve the conflicting configuration and/or dependencies (operation 506).

Subsequently, the system distributes the port profile and the corresponding VM MAC address to every member switch throughout the VCS fabric (operation 508). When a VM is initiated or migrated, the system then detects a matching virtual MAC address from the received ingress packets (operation 510). Based on the learned MAC address, the system then activates the corresponding port profile on the switch port (operation 512).

Configuration Orchestration

In embodiments of the present invention, a network device (such as a VCS member switch, or a stand-alone switch) implements a Web service interface. This Web service interface provides a communication channel to other network devices to exchange configuration and management information. The network device also implements a set of business logic, which, when triggered by either a command received via the Web service interface or a local trigger, determines the necessary configuration-related operations to be performed. The distributed business logic in each device collectively provides the intelligence in the network configuration. Such collaborations among multiple switches, hosts, and VMs ensure coherent updates to the network's configuration state. This configuration-orchestration mechanism is particularly useful in a datacenter environment, where virtual machines are often relocated.

Configuration orchestrations in a datacenter are usually due to changes in the environment within the datacenter. These changes act as triggers for initiating the business logic. Some common examples of triggers of orchestrations are: administrator initiated configuration changes, a virtual machine's movement in the datacenter, a switch or server coming online/offline, installation of new switches or servers, and loss of availability of devices due to malfunction. Typically, changes of virtual machines, e.g., location and QoS parameter changes, can lead to configuration changes at the physical switches (such as the advanced port profile management described above).

The business logic can also be used to audit the configuration of the local device or a remote device. Note that auditing typically does not change the configuration of a device. A typical audit involves querying and verifying a device's configuration information. In one embodiment, the business logical associated with audit operations can be stored in a separate entity from the regular network devices. This entity can trigger configuration auditing on one or more devices. The collected audit information can then analyzed and used to verify the configuration state of the datacenter.

In general, configuration orchestration provides a dynamic network management infrastructure that facilitates distributed and automatic configuration updates throughout a datacenter. Because each device maintains its own set of business logic, a configuration change in one device may trigger a series of cascaded changes in a number of devices throughout the network. As a result, the necessary changes are automatically propagated and implemented (if allowed) by all devices that are affected. In a conventional network, this is typically a tedious and error-prone manual process. However, with configuration orchestration, such configuration becomes much less laborious and much faster. One example of such cascaded automatic configuration is the re-location of a VM, as described in conjunction with FIG. 10.

With virtualization the older paradigm of static connection of a server to a switch port is no longer valid. Virtualization of servers in today's datacenter creates a new network access layer closer to the server. This new access layer imposes new requirements due to mobility of VMs within the datacenter. Furthermore, this new network access layer remains invisible to the access layer provided at the physical layer and is also invisible to the network administrator. For example, a physical switch needs to be able setup its access layer policies similar to that of the VM's profile. There can be multiple such profiles, one per VM, which the switch needs to be aware of at each of its interfaces. Additionally, due to the VM mobility, the profile information that is applied at the physical switch access layer needs to move with the new VM's location.

One embodiment of the present invention uses the Web Service Description Language (WSDL) and Simple Object Access Protocol (SOAP) as a mechanism to discover this new access layer, its profiles and policies as provisioned by the server administrator and further using it for synchronizing VM motion. More details about WSDL and SOAP can be found at: http://www.w3.org/2002/ws/desc/ which is incorporated in its entirety herein. In a network where each device provides this WSDL/SOAP interface for communicating management information with each other, this common communication channel functions as a logical "bus," meaning that any device can communicate with any device via this channel. In one embodiment, this WSDL interface is referred to as a "WSDL bus."

Because WSDL is a protocol based on open standards, the WSDL bus is vendor-neutral. This feature allows devices from different vendors to exchange configuration information and, in certain cases, configure one another. Furthermore, since many virtual machine products today use WSDL as the communication protocol between a VM and a VM managing center, the WSDL bus facilitates a seamless mechanism for exchanging configuration information between the VMs and the switch(es).

Figure 6:
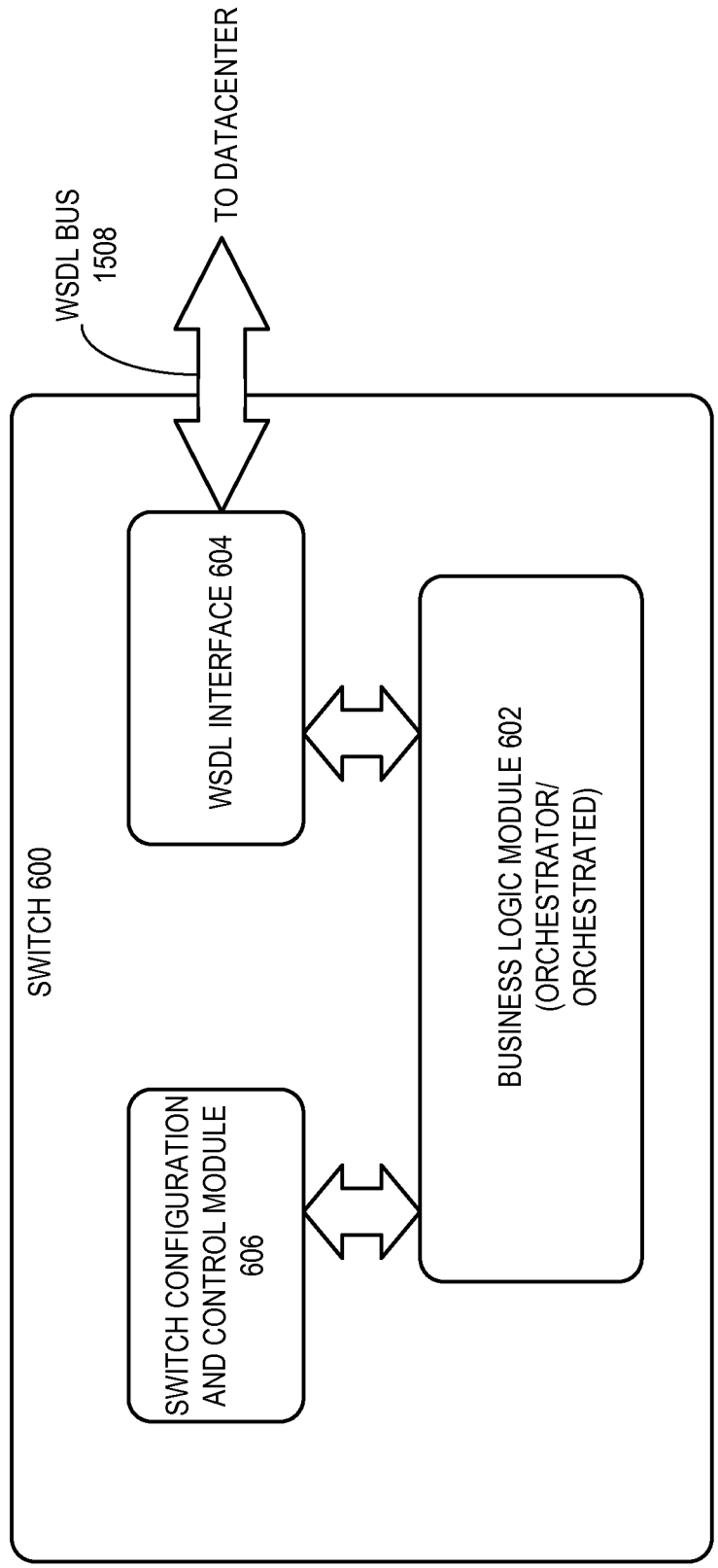
FIG. 6 illustrates an exemplary architecture of a switch that facilitates configuration orchestration, in accordance with one embodiment of the present invention.

FIG. 6 illustrates an exemplary architecture of a switch that facilitates configuration orchestration, in accordance with one embodiment of the present invention. In this example, a switch 600 includes a switch configuration and control module 606, a WSDL interface 604, and a business logic module 602. WSDL interface 604, together with similar WSDL interfaces on other devices, form a WSDL bus 608. In one embodiment, WSDL interface 604 provides a communication channel between switch 600 and the datacenter.

Switch configuration and control module 606 is responsible for effectuating configuration changes to switch 600. Both switch configuration and control module 606 and WSDL interface 604 are coupled to business logic module 602, which maintains a set of business logic that describes the inter-dependencies of configuration state changes. For example, if another device in the network wishes to change the configuration of switch 600, this other device can send a configuration command as a Web service request via WSDL interface 604. The command is then parsed and checked against the business logic stored in module 602 to determine whether the command can be executed locally or whether additional conditions have to be met (for example, this command might trigger configuration changes in other switches). When the command is cleared for execution, switch configuration and control module 606 effectuates the changes.

The example above is only one instance of configuration orchestration (where switch 600 is orchestrated). In general, configuration orchestration can include the following elements:
executing the business logic,
controlling configuration of the local switch from the business logic,
querying configuration information of other devices in the datacenter or network in general,
providing local switch's configuration information to trusted devices in the datacenter or network,
allowing triggers to initiate certain business logic,
sending triggers to other devices in the datacenter (including the local switch itself),
authenticating another device before accepting orchestration requests, and
allowing a user to compose business logic.

In general, a variety of communication protocols besides WSDL can be used to facilitate the aforementioned logical orchestration. WSDL is one of the preferred protocol because it is already used by a number of vendors of virtualization products and can provide security features. For example, WSDL provides authentication features which can be used to authenticate a remote device. In addition, the messages transmitted over the WSDL bus can be encrypted by, for example, a security socket layer (SSL).

Figure 7:
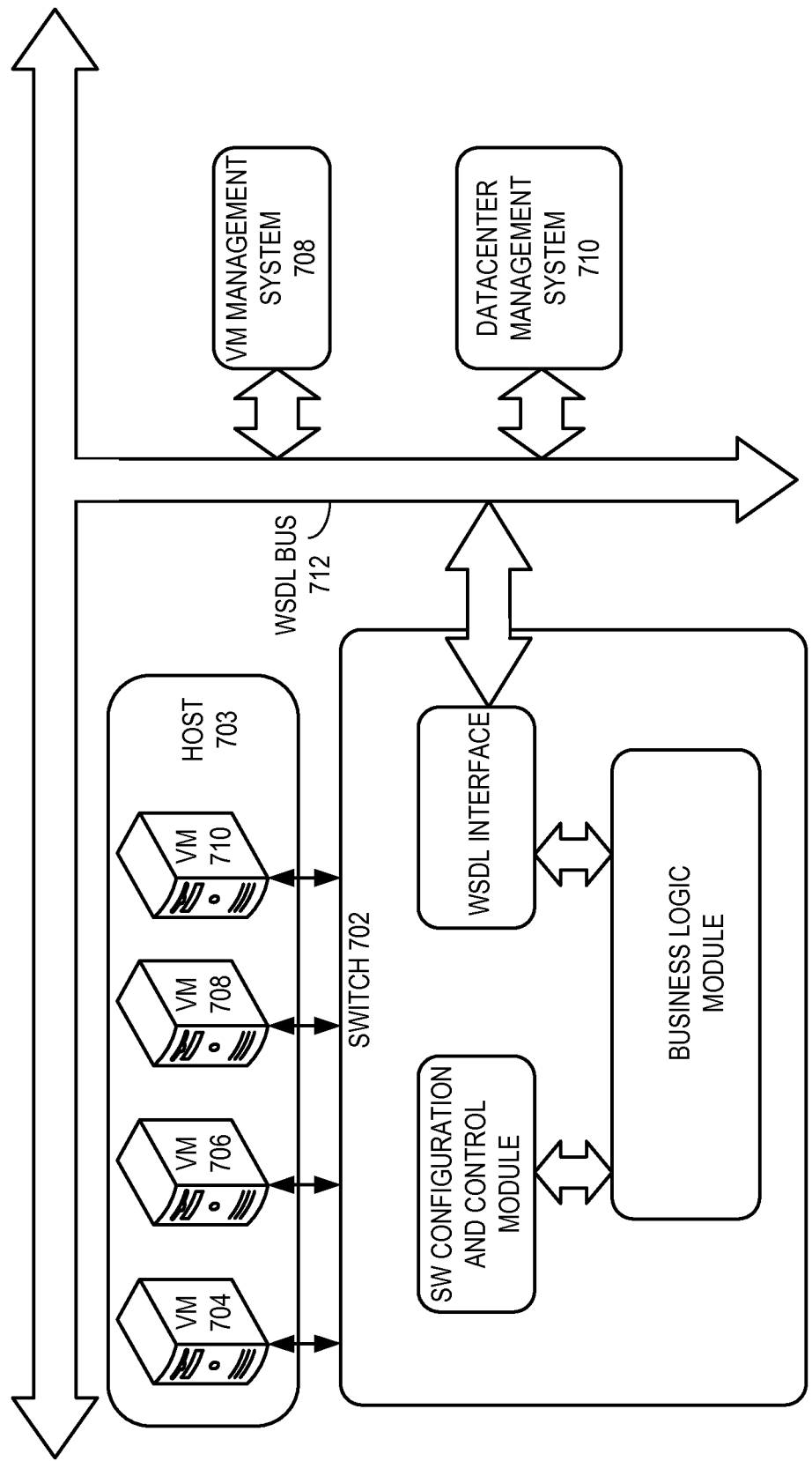
FIG. 7 illustrates an exemplary configuration of a data center that facilitates configuration orchestration, in accordance with one embodiment of the present invention.

FIG. 7 illustrates an exemplary configuration of a data center that facilitates configuration orchestration, in accordance with one embodiment of the present invention. In this example, a WSDL bus 712 couples a virtual machine management system 708, a datacenter management system 710, and a switch 702. In other words, each of these devices includes a WSDL interface and a set of internal business logic. Switch 702 is coupled to a physical host 703, which includes virtual machines 704, 706, 708, and 710. Note that for clarity purposes, FIG. 7 only shows the logical control plane and does not show the topology of the data plane. In the data plane, switch 702, VM management system 708, and datacenter management system 710 can be connected via a physical network.

During operation, the movement of VMs is controlled by VM management system 708. For example, when a server administrator intends to move VM 706 to a different location, he can log into VM management system 708 and issues a motion request. The business logic in VM management system 708 goes through a sequence of checks to determine whether VM 706 is allowed to be moved. One of these checks might be a query to switch 702 about whether the port profile corresponding to VM 706 is allowed to move to another switch. In response, switch 702 answers to VM management system 708 about the allowability of the port profile motion. Subsequently, both VM 706 and its corresponding port profile are moved.

Figure 8:
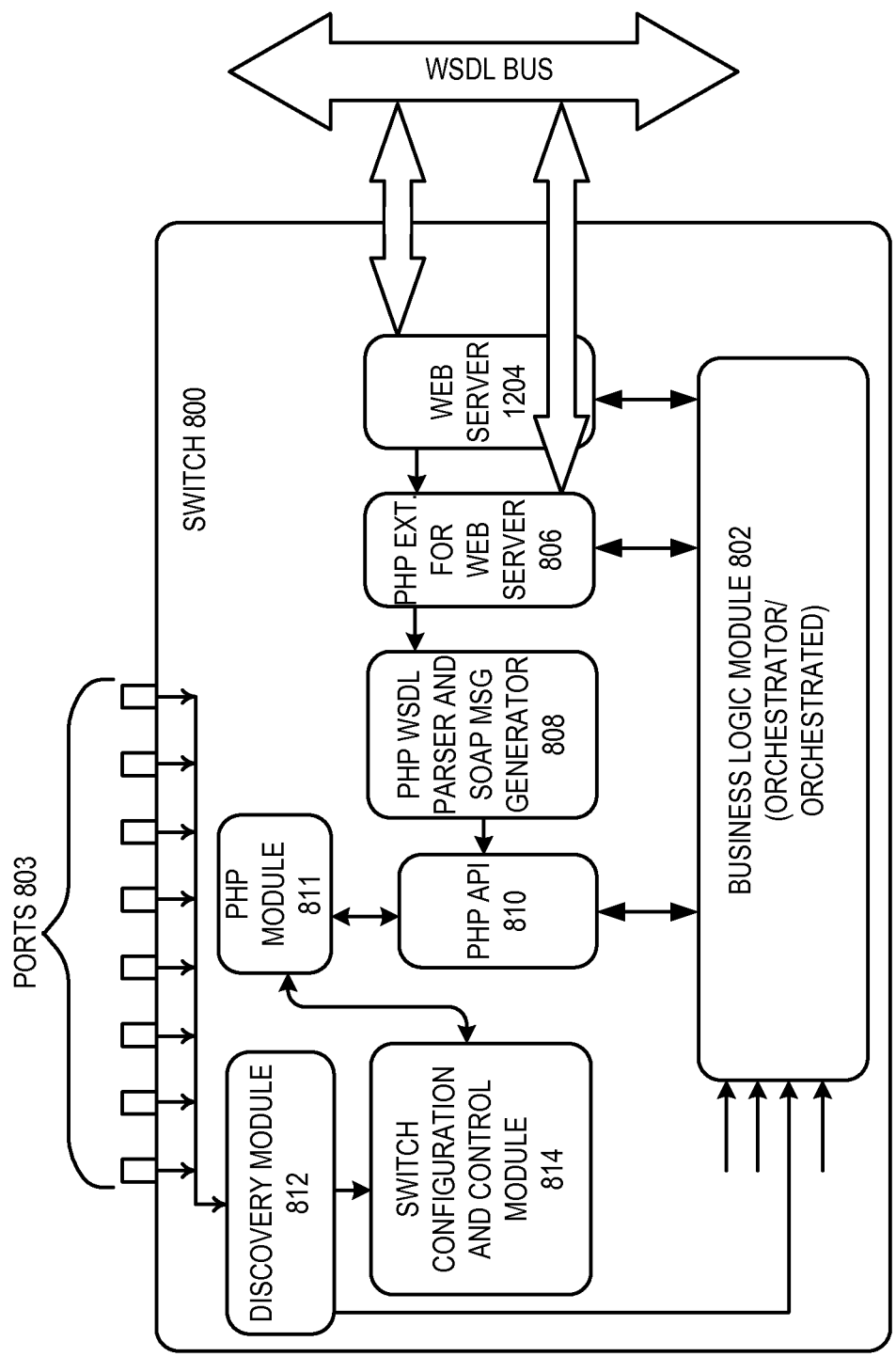
FIG. 8 illustrates an exemplary implementation of a switch that facilitates configuration orchestration based on a Web Service Definition Language (WSDL) interface, in accordance with one embodiment of the present invention.

FIG. 8 illustrates an exemplary implementation of a switch that facilitates configuration orchestration based on a Web Service Definition Language (WSDL) interface, in accordance with one embodiment of the present invention. In this example, a switch 800 includes a number of ports 803, a discovery module 812, a switch configuration and control module 814, and a business logic module 802. Also included are a web server 804, a PHP script module 806, and PHP WSDL parser and SOAP message generator 808, a PHP application interface (API) 810, and a PHP module 811

Discovery module 812 monitors the connectivity state of ports 803 and interfaces with switch configuration and control module 806. When certain conditions are met, the information provided by discovery module 812 might trigger some configuration operation based on the business logic. In other words, a change in the local connectivity state (such as a new VM being coupled to one of ports 803) may trigger the execution of the business logic.

Web server 804 and PHP extension 806 jointly provide the WSDL interface. PHP parser and SOAP message generator 808 is responsible for parsing the PHP script received via the WSDL interface and generating SOAP messages to be delivered to the WSDL interface on a remote device. PHP API 810 provides the API to business local module 802 as well as to the VM management system in the network. PHP module 811 in turn provides an interface with switch configuration and control module 814, which allows the PHP script-based commands to be effectuated on the local hardware.

In one embodiment, the business logic stored in module 802 is written in the PHP script language. Other scripting languages, such as Python, Perl, or Java, can also be used.

In addition, switch 800 provides a user interface that allows a user to author or modify the business logic using PHP scripts.

Figure 9:
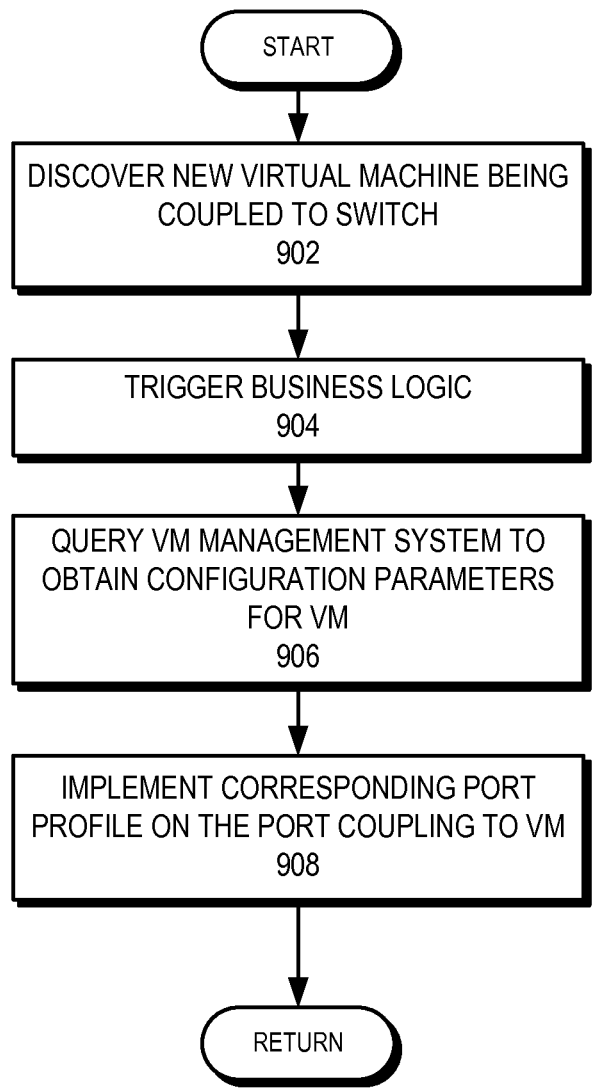
FIG. 9 presents a flowchart illustrating the process of implementing a port profile based on business logic, in accordance with one embodiment of the present invention.

FIG. 9 presents a flowchart illustrating the process of implementing a port profile based on business logic, in accordance with one embodiment of the present invention. During operation, the system discovers a new virtual machine has been coupled to the switch (operation 902). Subsequently, the discovered new VM connectivity triggers the local business logic, which can be implemented as a PHP script (operation 904). As part of the result of this execution, the system then queries the VM management system to obtain a set of configuration parameters for the newly coupled VM (operation 906). Note that such parameters may include VLAN configuration information, QoS parameters, and other information associated with a port profile. Next, the system implements the corresponding port profile on the port coupling to the VM (operation 908).

Figure 10:
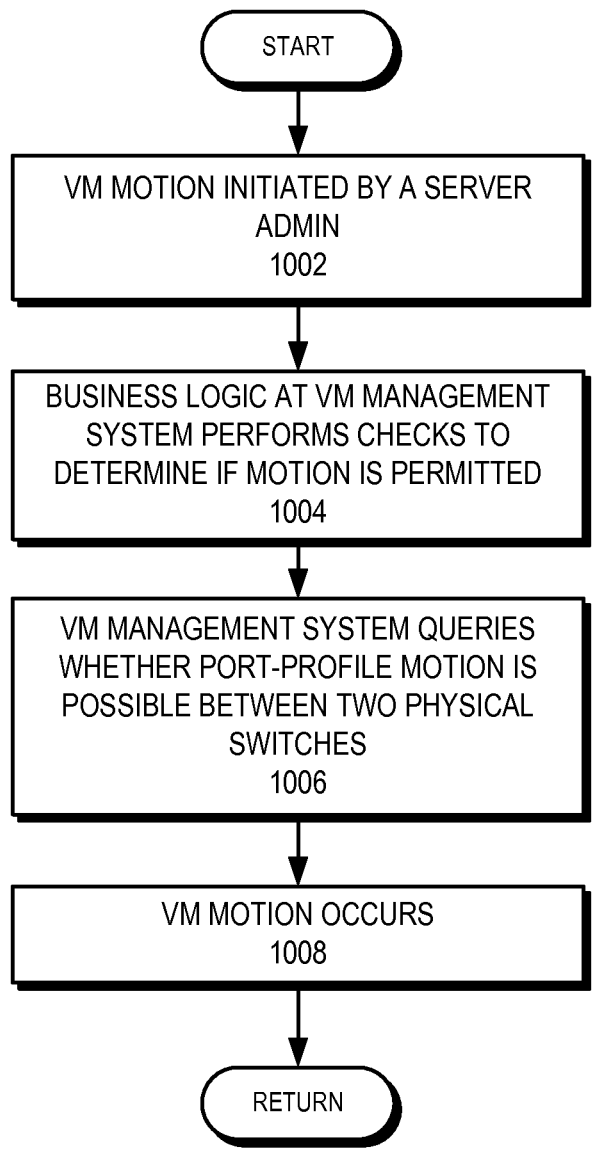
FIG. 10 presents a flowchart illustrating the process of moving a virtual machine with configuration orchestration, in accordance with one embodiment of the present invention.

FIG. 10 presents a flowchart illustrating the process of moving a virtual machine with configuration orchestration, in accordance with one embodiment of the present invention. During operation, a VM motion is initiated by a server administrator (operation 1002). Subsequently, the business logic at the VM management system performs checks to determine whether the motion is permitted (operation 1004). Assuming that the motion is permitted, the VM management system then queries the corresponding switch, via the WSDL bus, whether the port-profile motion is also possible between two physical switches (operation 1006). If the port-profile motion is possible, the VM motion proceeds to take place (operation 1008).

Exemplary VCS Member Switch Facilitating Configuration Orchestration

Figure 11:
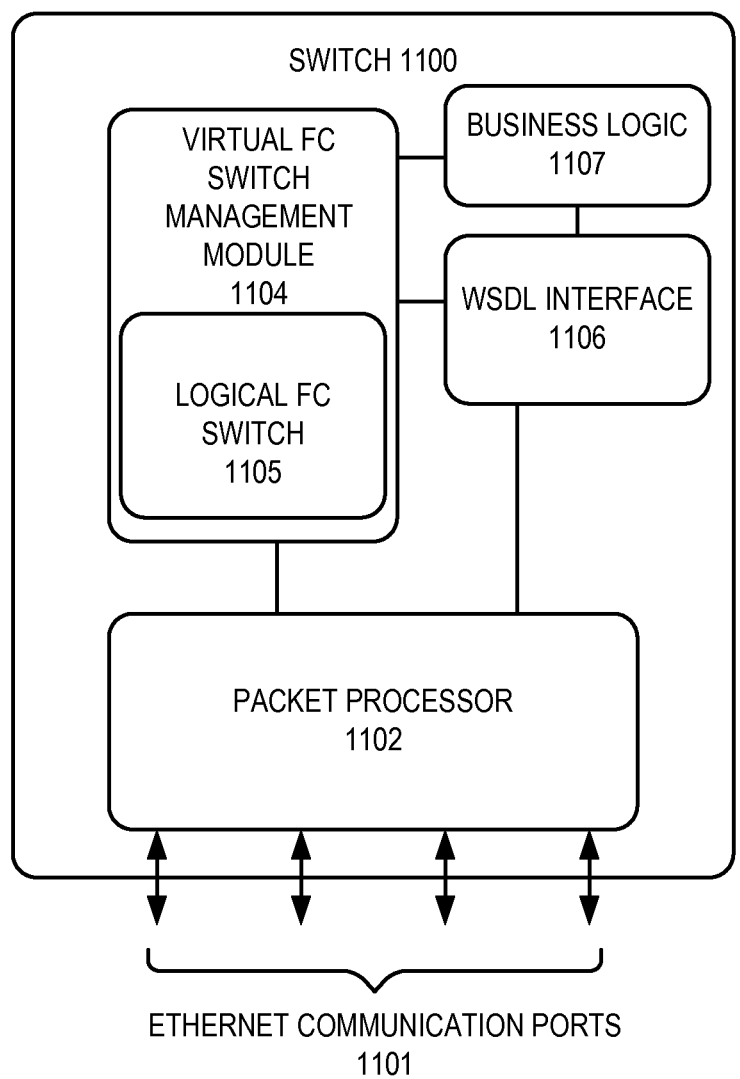
FIG. 11 illustrates an exemplary VCS member switch that facilitates configuration orchestration, in accordance with one embodiment of the present invention.

FIG. 11 illustrates an exemplary VCS member switch that facilitates configuration orchestration, in accordance with one embodiment of the present invention. In this example, the VCS member switch is a TRILL RBridge 1100 running special VCS software. RBridge 1100 includes a number of Ethernet communication ports 1101, which can transmit and receive Ethernet frames and/or TRILL encapsulated frames. Also included in RBridge 1100 is a packet processor 1102, a virtual FC switch management module 1104, a logical FC switch 1105, a WSDL interface 1106 and a set of business logic 1107.

During operation, packet processor 1102 extracts the source and destination MAC addresses of incoming frames, and attaches proper Ethernet or TRILL headers to outgoing frames. Virtual FC switch management module 1004 maintains the state of logical FC switch 1005, which is used to join other VCS switches using the FC switch fabric protocols. In addition, when packet processor 1102 identifies WSDL messages, such messages are forwarded to WSDL interface 1106. The configuration orchestration commands are then processed based on business logic 1107 to ensure that the desired configuration changes are properly made.

Note that although the configuration orchestration are described using VCS switches as examples, embodiments of the present invention, including the WSDL interface and business logic, can be implemented in any entity in a network. Such entities include datacenter management systems, VM management systems, individual hosts, storage devices, etc.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
   a processor;
   a computer-readable storage medium storing instructions which when executed by the processor causes the processor to perform a method, the method comprising;
   storing a data structure representing a set of business logic which is triggered by a condition applicable to a virtual machine, wherein the business logic specifies inter-dependencies of changes to configuration of the switch; and
   detecting that the condition has been applied to the virtual machine;
   in response to the detection, determining whether a port profile corresponding to the virtual machine is allowed to move to the switch based on compliance with the business logic; and
   applying the configuration to the switch in response to determining that the port profile is allowed to move to the switch.

2. The switch of claim 1,
   wherein the set of business logic is further triggered by a configuration command from a configuration interface comprising a Web service interface or a Web Service Description Language interpretation module.

3. The switch of claim 1,
   where in the business logic includes one or more of:
      a configuration operation associated with the changes to configuration of the switch; and
      the condition for the virtual machine;
      a query to a virtual machine managing system managing the virtual machine; and
      a command to a data center hosting the virtual machine.

4. The switch of claim 1,
   wherein the data structure comprises a statement in a script language.

5. The switch of claim 4,
   wherein the script language is based on one or more of: PHP, Python, Perl, and Java.

6. The switch of claim 1, wherein the method further comprises triggering the business logic in response to detecting a connectivity change associated with the switch or the virtual machine.

7. The switch of claim 1, wherein the method further comprises interpreting a user command to modify the business logic.

8. The switch of claim 1, wherein the business logic comprises a function for auditing configuration information associated with the switch or a remote device.

9. A method, comprising:
   storing a data structure representing a set of business logic which is triggered by a condition applicable to a virtual machine, wherein the business logic specifies inter-dependencies of changes to configuration of a computing system;
   detecting that the condition has been applied to the virtual machine;
   in response to the detection, determining whether a port profile corresponding to the virtual machine is allowed to move to the computing system based on the port profile's compliance with the business logic, wherein the port profile specifies configuration associated with the virtual machine; and
   applying the configuration to the computing system in response to determining that the port profile is allowed to move to the computing system.

10. The method of claim 9,
    wherein the set of business logic is further triggered by a configuration command encapsulated in a Web service message or a configuration command comprising a Web Service Description Language message.

11. The method of claim 9,
    where in the business logic includes one or more of:
       a configuration operation associated with the changes to configuration of the computing system; and
       the condition for the virtual machine;
       a query to a virtual machine managing system managing the virtual machine; and
       a command to a data center hosting the virtual machine.

12. The method of claim 9,
    wherein the data structure comprises a statement in a script language.

13. The method of claim 12,
    wherein the script language is based on one or more of: PHP, Python, Perl, and Java.

14. The method of claim 9, further comprising triggering the business logic in response to detecting a connectivity change associated with the computing system or the virtual machine.

15. The method of claim 9, further comprising interpreting a user command to modify the business logic.

16. The method of claim 9, wherein the business logic comprises a function for auditing configuration information associated with the computing system or a remote device.

17. A non-transitory computer readable storage medium storing instructions which when executed by a computer cause the computer to perform a method, the method comprising:
    storing a data structure representing a set of business logic which is triggered by a condition applicable to a virtual machine, wherein the business logic specifies inter-dependencies of changes to configuration of the computer;
    detecting that the condition has been applied to the virtual machine;
    in response to the detection, determining whether a port profile corresponding to the virtual machine is allowed to move to the computer based on the port profile's compliance with the business logic, wherein the port profile specifies configuration associated with the virtual machine; and applying the configuration to the computer in response to determining that the port profile is allowed to move to the computer.

18. The storage medium of claim 17, wherein the set of business logic is further triggered by a configuration command encapsulated in a Web service message or a configuration command comprising a Web Service Description Language message.

19. The storage medium of claim 17, where in the business logic includes one or more of:
   a configuration operation associated with the changes to configuration of the computer;
   the condition for the virtual machine;
   a query to a virtual machine managing system managing the virtual machine; and
   a command to a data center hosting the virtual machine.

20. The storage medium of claim 17, wherein the data structure comprises a statement in a script language.

21. The storage medium of claim 20, wherein the script language is based on one or more of: PHP, Python, Perl, and Java.

22. The storage medium of claim 17, wherein the method further comprises triggering the business logic in response to detecting a connectivity change associated with the computer or the virtual machine.

23. The storage medium of claim 17, wherein the method further comprises interpreting a user command to modify the business logic.

24. The storage medium of claim 17, wherein the business logic comprises a function for auditing configuration information associated with the computer or a remote device.

25. The switch of claim 1, wherein the method further comprises identifying the port profile based on an identifier of the virtual machine.

26. The method of claim 9, further comprising identifying the port profile based on an identifier of the virtual machine.

27. The storage medium of claim 17, wherein the method further comprises identifying the port profile based on an identifier of the virtual machine.

\* \* \* \* \*